(12) United States Patent
Kurobe

(10) Patent No.: US 7,031,248 B2
(45) Date of Patent: Apr. 18, 2006

(54) PUSH-PULL SIGNAL-GENERATING APPARATUS, AND OPTICAL-DISK APPARATUS

(75) Inventor: Shinichi Kurobe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/932,261

(22) Filed: Sep. 2, 2004

(65) Prior Publication Data
US 2005/0073938 A1 Apr. 7, 2005

Related U.S. Application Data

(63) Continuation of application No. PCT/JP2004/003414, filed on Mar. 15, 2004.

(30) Foreign Application Priority Data

| Sep. 2, 2003 | (JP) | 2003-309907 |
| Oct. 23, 2003 | (JP) | 2003-363345 |
| Oct. 27, 2003 | (JP) | 2003-365431 |

(51) Int. Cl.
*G11B 7/00* (2006.01)

(52) U.S. Cl. .............. 369/124.12; 369/44.32
(58) Field of Classification Search ............ 369/124.12
See application file for complete search history.

(56) References Cited

U.S. PATENT DOCUMENTS 5,459,706 A * 10/1995 Ogawa et al. ............ 369/53.31
6,545,972 B1 * 4/2003 Kato et al. ............... 369/124.12
6,563,773 B1 * 5/2003 Yanagisawa et al. ...... 369/44.41

FOREIGN PATENT DOCUMENTS

| JP | 63-244327 | 10/1988 |
| JP | 02-206033 | 8/1990 |
| JP | 03-248333 | 11/1991 |
| JP | 08-194969 | 7/1996 |
| JP | 09-073636 | 3/1997 |
| JP | 09-326122 | 12/1997 |
| JP | 10-069646 | 3/1998 |
| JP | 11-161982 | 6/1999 |
| JP | 2000-200419 | 7/2000 |
| JP | 2000-331347 | 11/2000 |
| JP | 2001-035090 | 2/2001 |
| JP | 2001-093147 | 4/2001 |
| JP | 2001-266486 | 9/2001 |
| JP | 2002-117536 | 4/2002 |
| JP | 2002-279640 | 9/2002 |
| JP | 2002-298372 | 10/2002 |
| JP | 2003-059056 | 2/2003 |
| JP | 2003-077130 | 3/2003 |
| JP | 2003-173540 | 6/2003 |

* cited by examiner

*Primary Examiner*—Paul W. Huber
(74) *Attorney, Agent, or Firm*—Dickstein Shapiro Morin & Oshinsky LLP

(57) ABSTRACT

An apparatus for generating push-pull signals is disclosed. The apparatus, used in an optical-disk apparatus, includes a first signal-adjusting circuit, a second signal-adjusting circuit, gain-determining means, and a difference-signal generating circuit.

17 Claims, 17 Drawing Sheets

PUSH-PULL SIGNAL-GENERATING APPARATUS, AND OPTICAL-DISK APPARATUS

CROSS-REFERENCE TO RELATED APPLICATION

This application is a U.S. continuation application filed under 35 USC 111(a) claiming benefit under 35 USC 120 and 365(c) of PCT application JP2004/003414, filed Mar. 15, 2004, which claims priority to Application Ser. No. 2003-309907, filed in Japan on Sep. 2, 2003, Application Ser. No. 2003-363345, filed in Japan on Oct. 23, 2003, and Application Ser. No. 2003-365431, filed in Japan on Oct. 27, 2003. The foregoing applications are hereby incorporated herein by reference.

TECHNICAL FIELD

The present invention generally relates to a technology for optically recording information in an information-recording medium, and, more particularly, to a push-pull signal-generating apparatus for generating push-pull signals based on a light beam reflected from a recording surface of an optical disk, and an optical-disk apparatus provided with the push-pull signal-generating apparatus.

BACKGROUND ART

In recent years, with progress in digital technologies and improvement in data compression technologies, the optical disk such as a CD (Compact Disk) and a DVD (Digital Versatile Disk) enabled to record an amount of data corresponding to approximately 7 times that of the CD in a disk having the same diameter as the CD, etc., has been watched with keen interest as a medium for recording user data such as music, movies, photographs, and computer software, and, with its price decreasing, an optical-disk apparatus having the optical disk as a target medium for recording the data has become commonplace.

In the optical disk, information is recorded by means of each of the lengths of a mark area and a space area and combinations thereof, each of the areas having reflectance different from each other. Thus, when recording information in the optical disk, the power of a laser beam output from a light-beam source (below also referred to as "the light-emission power") is controlled such that each of the mark areas and the space areas is formed at a predetermined location.

In a recordable-type optical disk such as a CD-R (CD-Recordable), a DVD-R (DVD-Recordable), and a DVD+R (DVD+Recordable), etc., containing on a recording surface organic colorants, when forming the mark area, the light-emission power is increased so as to heat and dissolve the colorants, deforming/transforming a portion of a disk substrate contacting therewith. On the other hand, when forming the space area, the light-emission power is decreased to about the same as when reproducing so that the disk substrate does not deform/transform. Hereby, the reflectance is lower in the mark area than in the space area. Such method of controlling the light-emission power is also called a single-pulse recording method. It is to be noted that the light-emission power when forming the mark area is also called the write power and the light-emission power when forming the space area is also called the bottom power.

Moreover, in a rewritable optical disk such as a CD-RW (CD-ReWritable), a DVD-RW (DVD-ReWritable), and a DVD+RW (DVD+ReWritable), etc., containing special alloys on a recording surface, when forming the mark area, the special alloys are heated to a first temperature and then rapidly cooled for creating an amorphous state. On the other hand, when forming the space area, the special alloys are heated to a second temperature (lower than the first temperature) and then slowly cooled for creating a crystal state. Hereby, the reflectance is lower in the mark area than in the space area. In this case, the light-emission power when forming the mark area is divided into multiple pulses (multi-pulsed), in order to eliminate an effect of heat accumulation. Such method of controlling the light-emission power is also called a multi-pulse recording method. The maximum value of the multi-pulsed light-emission power is also called the peak power and the minimum value is also called the bottom power. Moreover, the light-emission power for forming the space area is also called the erase power (smaller than the peak power and larger than the bottom power). It is to be noted that, with an increased rate of recording, the multi-pulse recording method is proposed, even for a colorant-type disk, for example a DVD-type optical disk (DVD-R, DVD+R, etc.).

In the recordable-type optical disk and the rewritable optical disk as described above, information is added by having, in advance at the time of manufacturing, tracks wobbled and modulating the wobbled shapes (refer to Patent Document 1, for example). Moreover, a phase-modulation method is used in a DVD+R and DVD+RW (below also called "DVD+ type" for the sake of convenience).

Furthermore, in a DVD+ type-compliant optical-disk apparatus, for instance, when accessing in an optical disk, a wobble signal corresponding to a wobble shape is detected from returned beam flux output from a light-beam source and reflected at a track, a reference-clock signal is generated from the wobble signal (refer to Patent Document 2), and the wobble signal is phase-demodulated by synchronizing with the reference clock signal for obtaining the information as described above. Moreover, in a DVD+ type, an especially important item of information as information as described above having been added to the track is address information. In the optical-disk apparatus, when recording the user data, the recording position is controlled based on the address information and the reference-clock signal. Thus, if the address information cannot be detected accurately, recording of the user data in a predetermined area is made impossible, possibly causing a recording error. More specifically, in a recordable-type DVD+R, causing a recording error leads to not being able to reuse that optical disk. Therefore, it is very important to accurately detect the wobble signal with high accuracy.

While the wobble signal as described above is detected based on a beam reflected from a track, the reflected beam contains intricate noise components with the wobble signal due to fluctuations, etc. in the data recorded in the optical disk and in the laser-beam output. Thus, an apparatus is proposed such that, for example, a light beam reflected from a track is photo-detected at a photo-detecting device divided into two parts by a dividing line in the direction corresponding to the tangential direction of the track (a two-part divided photo-detecting device), predetermined-level adjustments are made to the output signals (photo-electric converting signals) of each of the photo-detecting devices, and then a difference signal of the signals, or a push-pull signal, is generated and a wobble signal is detected (refer to Patent Document 3 through 7).

Patent Document 1
JP10-069646A.
Patent Document 2
JP2001-035090A.
Patent Document 3
JP2001-266486A.
Patent Document 4
JP2002-117536A.
Patent Document 5
JP2003-059056A.
Patent Document 6
JP2003-077130A.
Patent Document 7
JP8-194969A.

Now, the signal characteristics of the signals output from the photo-detecting devices largely differ between a case in which the RF-signal component is contained within the beam reflected from the track and a case in which the RF-signal component is not contained.

Thus, in order to generate a push-pull signal having a low noise level for both the recording time and the reproducing time, a circuit for generating push-pull signals in a case such that the RF-signal component is contained within the beam reflected from the track and a circuit for generating a push-pull signal in a case such that the RF-signal component is not contained within the beam reflected from the track are needed, resulting in one of the obstacles to reducing the size of the optical-disk apparatus.

Moreover, in order to generate a push-pull signal having a low noise level for both the recording time and the reproducing time, a signal-adjusting circuit for use in a case such that the RF-signal component is contained within the beam reflected from the track and a signal-adjusting circuit for use in a case such that the RF-signal component is not contained within the beam reflected from the track are needed, resulting in another one of the obstacles to reducing the size and the cost of the optical-disk apparatus.

DISCLOSURE OF THE INVENTION

Accordingly, it is a general object of the present invention to provide a technology for optically recording information in an information recording medium that substantially obviates one or more problems caused by the limitations and disadvantages of the related art.

It is a more particular object of the present invention to provide a push-pull signal-generating apparatus enabling: a reducing of size and cost while maintaining the noise contained in generated pull-pull signals at a low level; and a stable performing of recording and reproducing in an optical disk without introducing an increase in size and cost of the apparatus.

According to the invention, an apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region that are divided in two parts by a dividing line in the direction corresponding to the tangential direction of the tracks, the signals consisting of a first photo-electric converting signal from the first photo-detecting region and a second photo-electric converting signal from the second photo-detecting region, includes a first signal-adjusting circuit for adjusting the first photo-electric converting signal at a first gain, a second signal-adjusting circuit for adjusting the second photo-electric converting signal at a second gain, gain-determining means for selecting one of the amplitude and the average level of an output signal of the first signal-adjusting circuit as a first determining value and selecting one corresponding to the first determining value out of the amplitude and the average level of an output signal of the second signal-adjusting circuit as a second determining value, and determining, based on the first determining value and the second determining value, at least one of the first gain and the second gain such that predetermined noise component levels contained in each of the output signal of the first signal-adjusting circuit and the output signal of the second signal-adjusting circuit are almost equal to each other, and a difference-signal generating circuit for generating a difference signal between the output signal of the first signal-adjusting circuit and the output signal of the second signal-adjusting circuit.

An apparatus for generating push-pull signals in an embodiment of the invention enables a reducing of size and cost while maintaining the noise contained in generated pull-pull signals at a low level, and a stable performing of recording and reproducing in an optical disk without introducing an increase in size and cost of the apparatus.

According to another aspect of the invention, an apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region that are divided into two parts by a dividing line in the direction corresponding to the tangential direction of the tracks, the signals consisting of a first photo-electric converting signal from the first photo-detecting region and a second photo-electric converting signal from the second photo-detecting region, includes a first signal-adjusting circuit for adjusting the first photo-electric converting signal at a first gain, a second signal-adjusting circuit for adjusting the second photo-electric converting signal at a second gain, a difference-signal generating circuit for generating a difference signal between an output signal of the first signal-adjusting circuit and an output signal of the second signal-adjusting circuit, and gain-determining means for determining, based on the peak level and the bottom level in the difference signal, at least one of the first gain and the second gain such that predetermined noise component levels contained in each of the output signal of the first signal-adjusting circuit and the output signal of the second signal-adjusting circuit are almost equal with each other.

An apparatus for generating push-pull signals in an embodiment of the invention enables a reducing of size and cost while maintaining the noise contained in generated pull-pull signals at a low level, and a stable performing of recording and reproducing in an optical disk without introducing an increase in size and cost of the apparatus.

According to another aspect of the invention, an apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region that are divided into two parts by a dividing line in the direction corresponding to the tangential direction of the tracks, the signals consisting of a first photo-electric converting signal from the first photo-detecting region and a second photo-electric converting signal from the second photo-detecting region includes a signal-adjusting circuit for adjusting the first photo-electric converting signal, a difference-signal generating circuit for generating a difference signal between an output signal of the signal-adjusting circuit and the second photo-electric converting signal, and gain-determining means for determining, based on the peak level and the bottom level in the difference signal, a gain of the signal-adjusting circuit such that predetermined noise component levels contained in each of the output signal of the signal-adjusting circuit and the second photo-electric converting signal are almost equal to each other.

An apparatus for generating push-pull signals in an embodiment of the invention enables a reducing of size and cost while maintaining the noise contained in generated pull-pull signals at a low level, and a stable performing of recording and reproducing in an optical disk without introducing an increase in size and cost of the apparatus.

BRIEF DESCRIPTION OF THE DRAWINGS

Other objects, features, and advantages of the present invention will become more apparent from the following descriptions when read in conjunction with the accompanying drawings, in which.

BEST MODE FOR CARRYING OUT THE INVENTION (First Embodiment)

Figure 1:
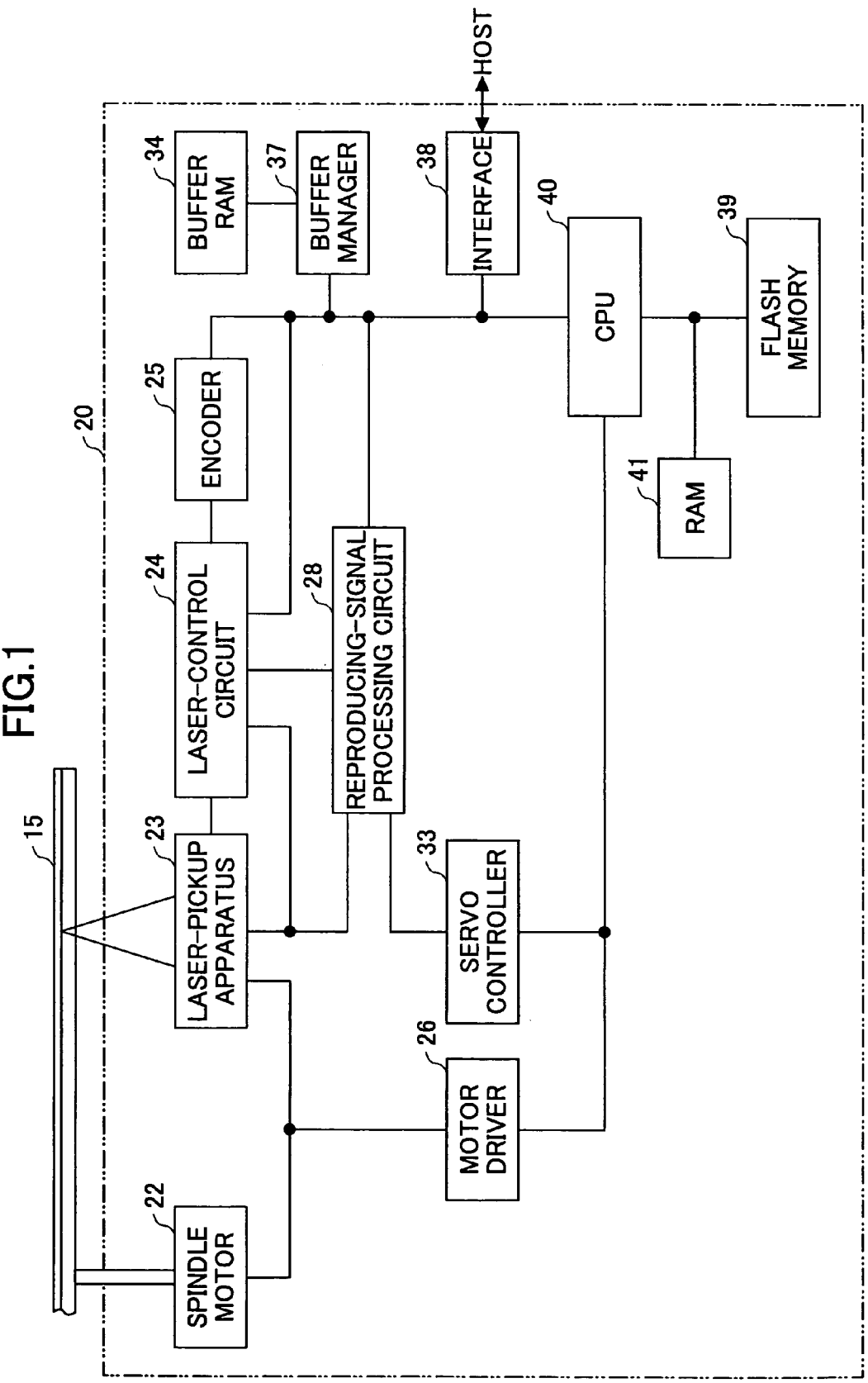
FIG. 1 is a block diagram illustrating a configuration of an optical-disk apparatus according to a first embodiment of the invention.

Below, descriptions are given based on the accompanying drawings, on embodiments for carrying out the present invention. FIG. 1 illustrates a schematic configuration of an optical-disk apparatus 20 according to a first embodiment of the invention.

The optical-disk apparatus 20 illustrated in FIG. 1, according to an embodiment of the present invention, is provided with a spindle motor 22 for driving the rotation of an optical disk 15, an optical-pickup apparatus 23, a laser-control circuit 24, an encoder 25, a motor driver 26, a reproducing-signal processing circuit 28, a servo controller 33, a buffer RAM 34, a buffer manager 37, an interface 38, a flash memory 39, a CPU 40, and a RAM 41, etc. It is to be noted that connecting lines in FIG. 1 indicates representative flows of signals and information, but not all of the interconnecting relationships among the different blocks. It is to be noted that in the present embodiment the use of a DVD+R standards-compliant information-recording medium as an example for the optical disk 15 is assumed.

Figure 2:
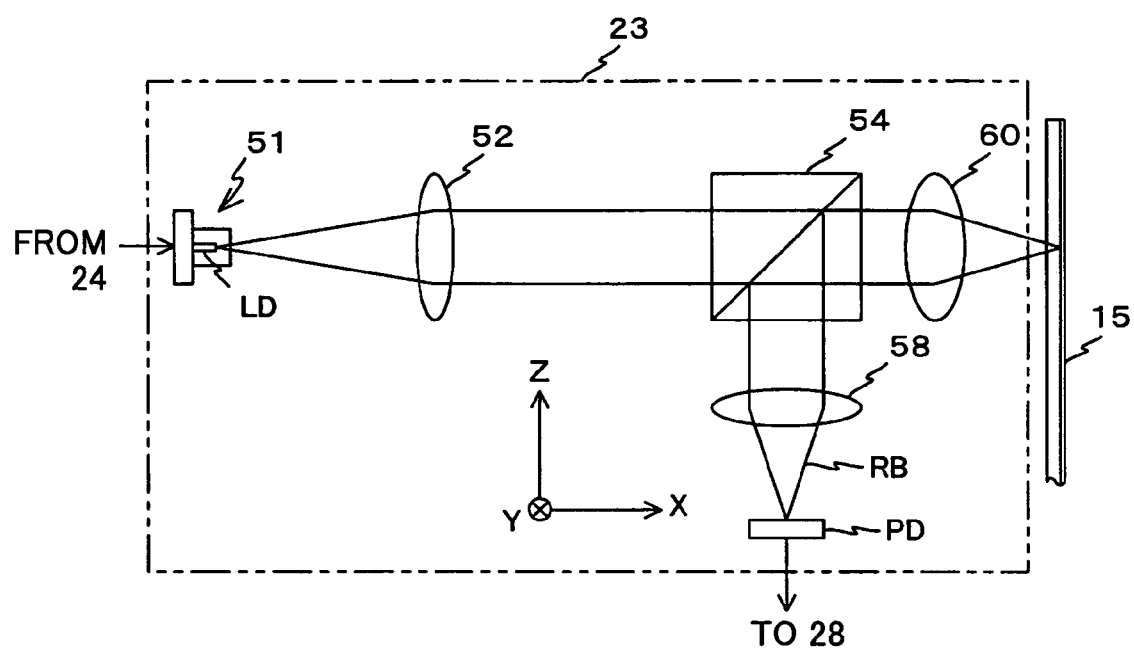
FIG. 2 is a diagram for describing a configuration of an optical-pickup apparatus according to FIG. 1.

The optical-pickup apparatus 23 is an apparatus for irradiating a laser beam onto a recording surface having formed spiral-shaped or concentric-shaped tracks and for photo-detecting the beam reflected from the recording surface. This optical-pickup apparatus 23, as illustrated in FIG. 2 as an example, is provided with a light-beam source unit 51, a collimator lens 52, a beam splitter 54, an objective lens 60, a detecting lens 58, a photo-detector PD as a photo-detecting device, and a driving system (a focusing actuator, a tracking actuator, and a seek motor (none shown)), etc.

The light-beam source 51 is configured to include a semiconductor laser LD as a light-beam source for emitting a laser beam with the wavelength of 660 nm. It is to be noted that, in the present embodiment, the direction of maximum-intensity output of the beam flux of the laser beam output from the light-beam source unit 51 is assumed to be the +X direction.

The collimator lens 52, arranged on the +X side of the light-beam source unit 51, makes the beam flux output from the light-beam source unit 51 to be a roughly-parallel beam.

The beam splitter 54, arranged on the +X side of the collimator lens 52, transmits the roughly-parallel beam flux through the collimator lens 52 as it is. Moreover, the beam splitter 54 deflects the beam flux (the returned beam flux) reflected at the recording surface of the optical disk 15 and input via the objective lens 60 as described above to the −Z direction.

The objective lens 60, arranged on the +X side of the beam splitter 54, condenses onto the recording surface of the optical disk 15 the beam flux transmitted through the beam splitter 54.

The detecting lens 58, arranged on the −Z side of the beam splitter 54, condenses onto the photo-detecting surface of the photo-detector PD as described above the returned beam flux RB deflected to the −Z direction at the beam splitter 54.

Figure 3:
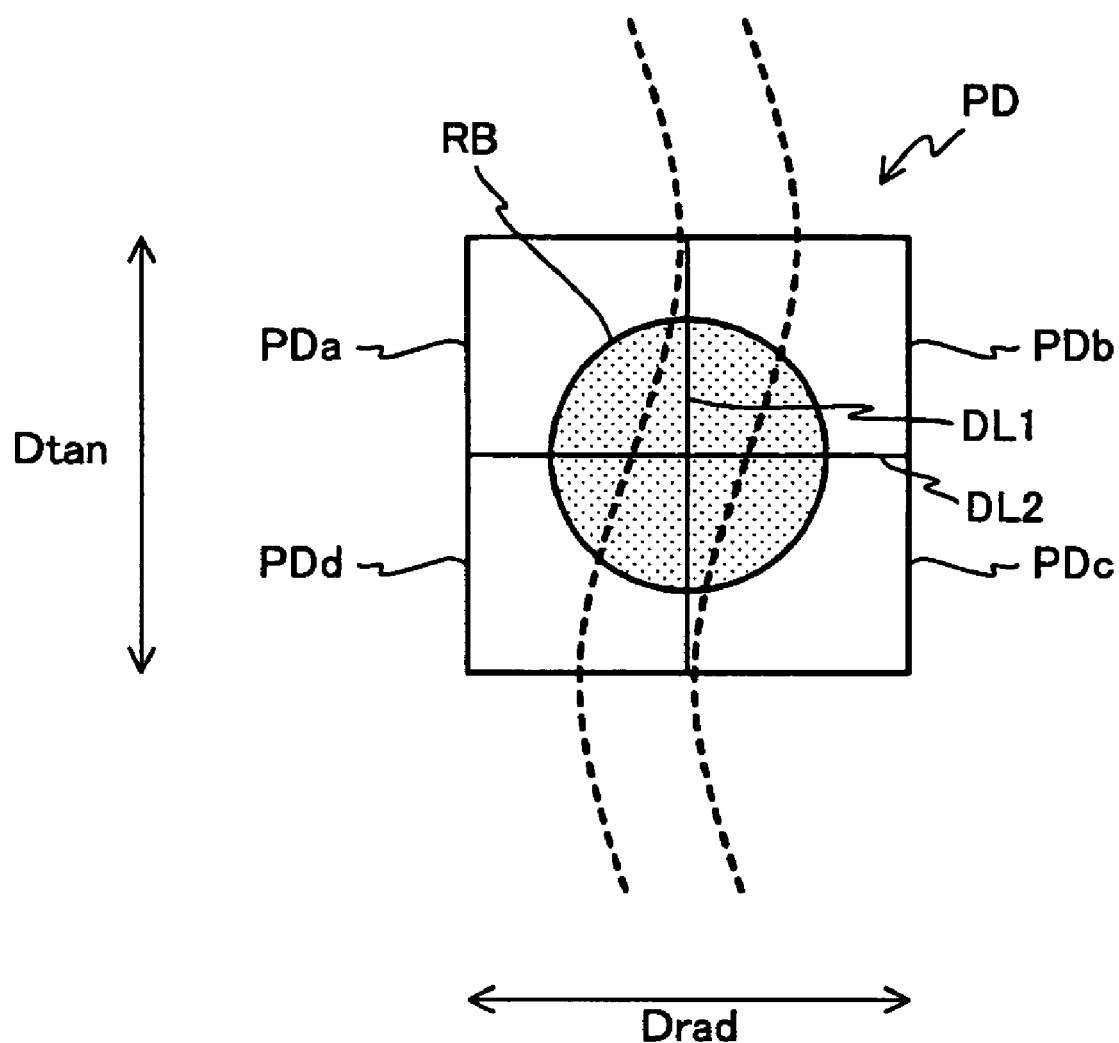
FIG. 3 is a diagram for describing a photo-detector in FIG. 2.

The photo-detecting surface of the photo-detector PD, as illustrated in FIG. 3, is divided into two parts by a dividing line DL1 in the direction Dtan (the vertical direction in FIG. 3) corresponding to the tangential direction of the tracks (indicated with dotted lines), and also divided into two parts by a dividing line DL2 in the direction Drad (the horizontal direction in FIG. 3) corresponding to the direction orthogonal to the tangential direction of the tracks. In other words, the photo-detecting surface of the photo-detector PD is divided into four photo-detecting regions (PDa, PDb, PDc, and PDd). The photo-detecting region PDa is positioned on the left side of the dividing line DL1 in FIG. 3 as well as on the upper side of the dividing line DL2 in FIG. 3. The photo-detecting region PDb is positioned on the right side of the photo-detecting region PDa as described above in FIG. 3. The photo-detecting region PDc, is positioned on the lower side of the photo-detecting region PDb as described above in FIG. 3. The photo-detecting region PDd is positioned on the lower side of the photo-detecting region PDa as described above in FIG. 3. Then, from each photo-detecting region, a signal corresponding to the photo-detected amount is output to the reproducing-signal processing circuit 28. It is to be noted that the photo-detector PD is arranged such that the returned beam flux RB is photo-detected at almost the center of the photo-detecting surface.

The focusing actuator (not shown) as described above is an actuator for micro-driving the objective lens 60 in the focusing direction (the X-axis direction herein) which is the optical-axial direction of the objective lens 60.

The tracking actuator (not shown) as described above is an actuator for micro-driving the objective lens 60 in the tracking direction (the Z-axis direction herein) which is the direction orthogonal to the tangential direction of the tracks.

The seek motor (not shown) as described above is a motor for driving the optical-pickup apparatus itself in the sledge direction (the Z-axis direction herein).

Returning to FIG. 1, the flash memory 39 as described above is provided with a program area and a data area, the program area having stored programs written in a code readable by the CPU 40. Moreover, in the data area is stored information regarding the light-emission characteristics of the semiconductor laser LD, information regarding a seek operation of the optical-pickup apparatus 23 (below also called as "seek information"), and conditions of recording, etc.

The buffer RAM 34 has a buffer area for temporarily storing data to be recorded in the optical disk 15 (recording data) and data reproduced from the optical disk 15 (reproduced data), and a variables area for storing various program variables.

The buffer manager 37 manages the input/output of data to/from the buffer RAM 34. Then, once the data amount accumulated in the buffer area reaches a predetermined amount, the CPU 40 is notified.

The encoder 25, based on an instruction of the CPU 40, takes out the recording data accumulated in the buffer RAM 34 via the buffer manager 37, performs data modulation and adding of error correction code, etc., and generates a signal for writing in the optical disk 15. The writing signal generated herein is output to the laser-control circuit 24.

The laser-control circuit 24, based on the light-emission characteristics of the semiconductor laser LD and the writing signal from the encoder 25, etc., generates a signal for driving the semiconductor laser LD. In other words, the power of the laser beam irradiated onto the optical disk 15 is controlled.

The interface 38, a bi-directional communications interface with the host, complies with the ATAPI (AT Attachment Packet Interface) standards as an example.

Figure 4:
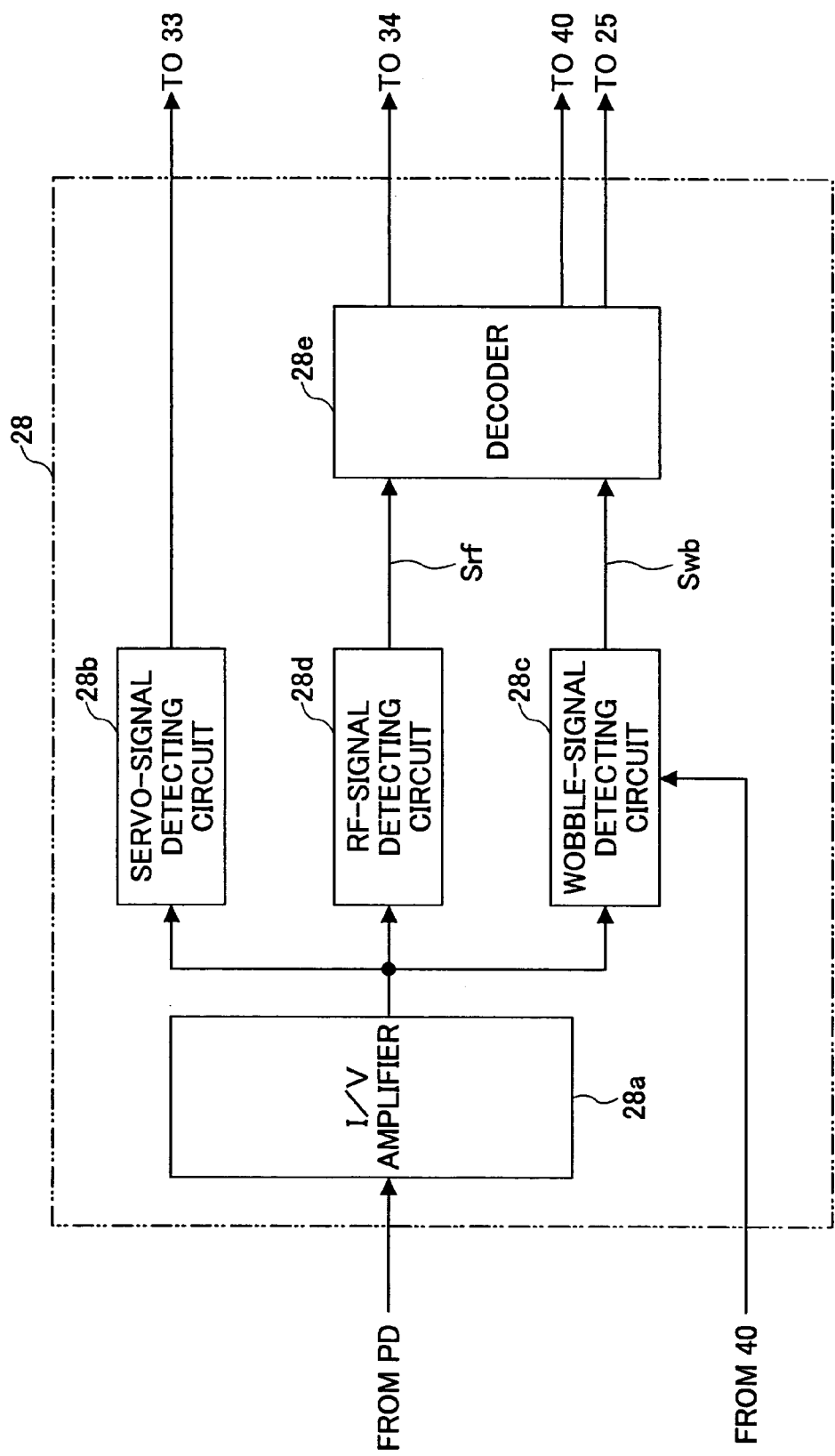
FIG. 4 is a block diagram for describing a configuration of a reproducing-signal processing circuit in FIG. 1.

The reproducing-signal processing circuit 28, as illustrated in FIG. 4, is configured with an I/V amplifier 28a, a servo-signal detecting circuit 28b, a wobble-signal detecting circuit 28c, a RF-signal detecting circuit 28d, and a decoder 28e, etc.

The I/V amplifier 28a converts to a voltage signal for amplifying at a predetermined gain a current signal which is the output signal of the optical detector PD. The converted voltage signal herein is output to the servo-signal detecting circuit 28b as described above, the wobble-signal detecting circuit 28c, and the RF-signal detecting circuit 28d.

The servo-signal detecting circuit 28b detects a servo signal (a focus-error signal, or a track-error signal, etc.) based on the output signal of the I/V amplifier 28a. The servo signal detected herein is output to the servo controller 33.

Figure 5:
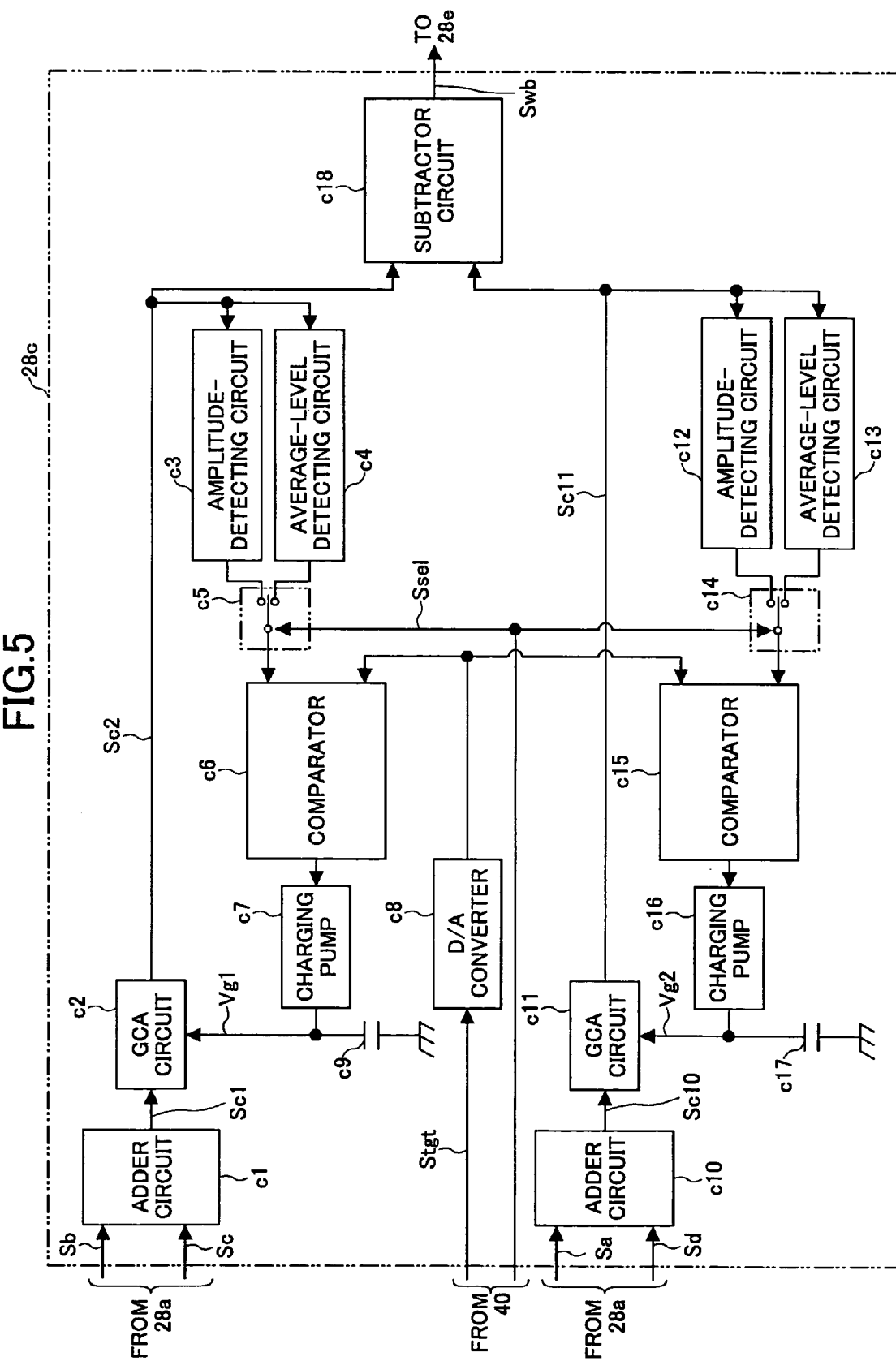
FIG. 5 is a block diagram for describing a configuration of a wobble-signal detecting circuit in FIG. 4.

The wobble-signal detecting circuit 28c detects a wobble signal Swb based on the output signal of the I/V amplifier 28a. This wobble-signal detecting circuit 28c, as illustrated in FIG. 5 as an example, has two adder circuits (c1, c10), two gain-control amplifier circuits (GCA circuits: c2 (a first signal-adjusting circuit), c11 (a second signal-adjusting circuit)), two amplitude-detecting circuits (c3, c12), two average-level detecting circuits (c4, c13), two toggle switches (c5, c14), two comparators (c6, c15), two charging pumps (c7, c16), a D/A converter c8, two capacitors (c9, c17), and a subtractor circuit c18 (a difference-signal generating circuit), etc.

The adder circuit c1 generates a signal Sc1 adding each of the output signals Sb and Sc of the I/V amplifier 28a. Herein the signal Sb is an output signal of the I/V amplifier 28a corresponding to the output signal of the photo-detecting region PDb, and the signal Sc is an output signal of the I/V amplifier 28a corresponding to the output signal of the photo-detecting region PDc. In other words, from the adder circuit c1, the signal Sc1 corresponding to a first photo-electric converting signal is output. The signal Sc1 from the adder circuit c1 is output to the gain-control amplifier circuit c2.

The gain-control amplifier circuit c2 adjusts the output signal Sc1 of the adder circuit c1 at a first gain. The adjusted signal Sc2 is output to the subtractor circuit c18, the amplitude-detecting circuit c3 and the average-level detecting circuit c4. It is to be noted that the first gain can be varied within a predetermined range (from −6 dB to +6 dB, for example) with a first gain-control voltage Vg1. Herein, it is set such that the larger the first gain-control voltage Vg1 the larger the first gain, and the smaller the first gain-control voltage Vg1 the smaller the first gain.

The amplitude-detecting circuit c3 detects the amplitude of the output signal Sc2 of the gain-control amplifier circuit c2. The outcome detected herein is output to the toggle switch c5. It is to be noted that the amplitude-detecting circuit c3 may be configured to include a peak-level detecting circuit and a bottom-level detecting circuit, for instance.

The average-level detecting circuit c4 detects the average level of the output signal Sc2 of the gain-control amplifier circuit c2. The outcome detected herein is output to the toggle switch c5. It is to be noted that the average-level detecting circuit c4 may be configured to include a low-pass filter, for instance.

The toggle switch c5, based on a selecting signal Ssel from the CPU 40, selects one of the output signal of the amplitude-detecting circuit c3 and the output signal of the average-level detecting circuit c4. Herein, it is set such that the output of the amplitude-detecting circuit c3 is selected when the selecting signal Ssel is at 0 (the low level) and the output of the average-level detecting circuit c4 is selected when the selecting signal Ssel is at 1 (the high level). The output signal of the toggle switch c5 becomes one input of the comparator C6 as a first decision value.

The D/A converter c8 converts a target-voltage signal Stgt from the CPU 40 to an analog signal. This signal converted at the D/A converter c8 is output as the target value to the comparator c6 and the comparator c15.

The comparator c6 compares the output signal of the toggle switch c5 and the output signal of the D/A converter c8. The outcome of the comparison is output to the charging pump c7.

The charging pump c7, depending on the compared outcome at the comparator c6, performs a charging or a discharging of the capacitor c9. Herein, it is set such that the capacitor c9 is charged when the output signal of the toggle switch c5 is smaller than the output signal of the D/A converter c8, and the capacitor c9 is discharged when the output signal of the toggle switch c5 is larger than the output signal of the D/A converter c8. Then, it is set such that as the capacitor c9 is charged the first gain-control voltage Vg1 as described above increases, and as the capacitor c9 is discharged the first gain-control voltage Vg1 as described above decreases. In other words, the output signal Sc2 of the gain-control amplifier circuit c2 is controlled such that its amplitude or average level almost corresponds to the target value.

The adder circuit c10 generates a signal adding the output signals Sa and Sd of the I/V amplifier 28a. Herein, the signal Sa is an output signal of the I/V amplifier 28a corresponding to the output signal of the photo-detecting region PDa, and the signal Sd is an output signal of the I/V amplifier 28a corresponding to the output signal of the photo-detecting region PDd. In other words, a signal Sc10 corresponding to a second photo-electric converting signal is output from the adder circuit c10. The signal Sc10 from the adder circuit c10 is output to the gain-control amplifier circuit c11.

The gain-control amplifier circuit c11 adjusts the output signal Sc10 of the adder circuit c10 at a second gain. The adjusted signal Sc11 is output to the subtractor circuit c18, the amplitude-detecting circuit c12, and the average-level detecting circuit c13. It is to be noted that the second gain can be varied within a predetermined range (for example, −6 dB to +6 dB) with a second gain-control voltage Vg2. Herein, it is set such that the larger the second gain-control voltage Vg2 the larger the second gain, and the smaller the second gain-control voltage Vg2 the smaller the second gain.

The amplitude-detecting circuit c12 detects the amplitude of the output signal Sc11 of the gain-control amplifier circuit c11. The detected outcome herein is output to the toggle switch c14. It is to be noted that the amplitude-detecting circuit c12 may be configured to include a peak-level detecting circuit and a bottom-level detecting circuit, for example.

The average-level detecting circuit c13 detects the average level of the output signal Sc11 of the gain-control amplifier circuit c11. The outcome detected herein is output to the toggle switch c14. It is to be noted that the average-level detecting circuit c13 may be configured to include a low-pass filter, for example.

The toggle switch c14, based on the selecting signal Ssel from the CPU 40, selects one of the output signal of the amplitude-detecting circuit c12 and the output signal of the average-level detecting circuit c13. Herein it is set such that, as an example, the output signal of the amplitude-detecting circuit c12 is selected when the selecting signal Ssel is at 0 (the low level) and the output signal of the average-level detecting circuit c13 is selected when the selecting signal Ssel is at 1 (the high level). The output signal of the toggle switch c14 becomes one input signal of the comparator c15 as a second decision value.

The comparator c15 compares the output signal of the toggle switch c14 and the output signal of the D/A converter c8. The outcome of the comparison is output to the charging pump c16.

The charging pump c16 performs a charging or a discharging of the capacitor c17 depending on the outcome compared at the comparator c15. Herein, it is set such that the capacitor c17 is charged when the output signal of the toggle switch c14 is smaller than the output signal of the D/A converter 8, and the capacitor is discharged when the output signal of the toggle switch c14 is larger than the output signal of the D/A converter 8. Then, it is set such that as the capacitor c17 is charged the second gain-control voltage Vg2 as described above increases, and as the capacitor c17 is discharged the second gain-control voltage Vg2 as described above decreases. In other words, the output signal Sc11 of the gain-control amplifier circuit c11 is controlled such that its amplitude or average level almost corresponds with the target value.

The subtractor circuit c18 subtracts the output signal Sc11 of the gain-control amplifier circuit c11 from the output signal Sc2 of the gain-control amplifier circuit c2 and generates a subtracted signal (a push-pull signal). The subtracted signal generated herein is output to the decoder 28e as a wobble signal Swb.

The RF-signal detecting circuit 28d detects a RF signal based on the output signal from the I/V amplifier 28a.

The decoder 28e demodulates the wobble signal Swb detected at the wobble-signal detecting circuit 28c and obtains address information, etc. The address information obtained herein is output to the CPU 40. Moreover, the decoder 28e performs a decoding process and an error-detection process on the RF signal detected at the RF-signal detecting circuit 28d, performs an error-correction process when an error is detected, and then stores the RF signal as reproduced data in the buffer RAM 34 via the buffer manager 37. It is to be noted that the RF signal contains the address information and the address information extracted from the RF signal is output to the CPU 40.

Returning to FIG. 1, the servo controller 33 as described above generates a focus-control signal for correcting for a focus offset based on the focus-error signal from the servo-signal detecting circuit 28b. Each of the control signals generated herein is output to the motor driver 26 at the state of servo being on and is not output at the state of servo being off. Each of the states of the servo being on and the servo being off is set by the CPU 40.

The motor driver 26 outputs to the optical-pickup apparatus 23 a signal for driving the focusing actuator as described above based on the focus-control signal as described above, and outputs to the optical-pickup apparatus 23 a signal for driving the tracking actuator as described above based on the tracking-control signal as described above. In other words, the tracking control and the focus control are performed with the servo-signal detecting circuit 28b, the servo controller 33, and the motor driver 26. Moreover, the motor driver 26 outputs each of the signals for driving the spindle motor 22 and the seek motor as described above, respectively, based on the control signals from the CPU 40.

The CPU 40, in accordance with programs stored in a program area of the flash memory 39, controls the operations of each of the sections as described above and stores data required for control, etc., in a variables area of the buffer RAM 34, and the RAM 41.

(Reproducing Process)

Figure 6:
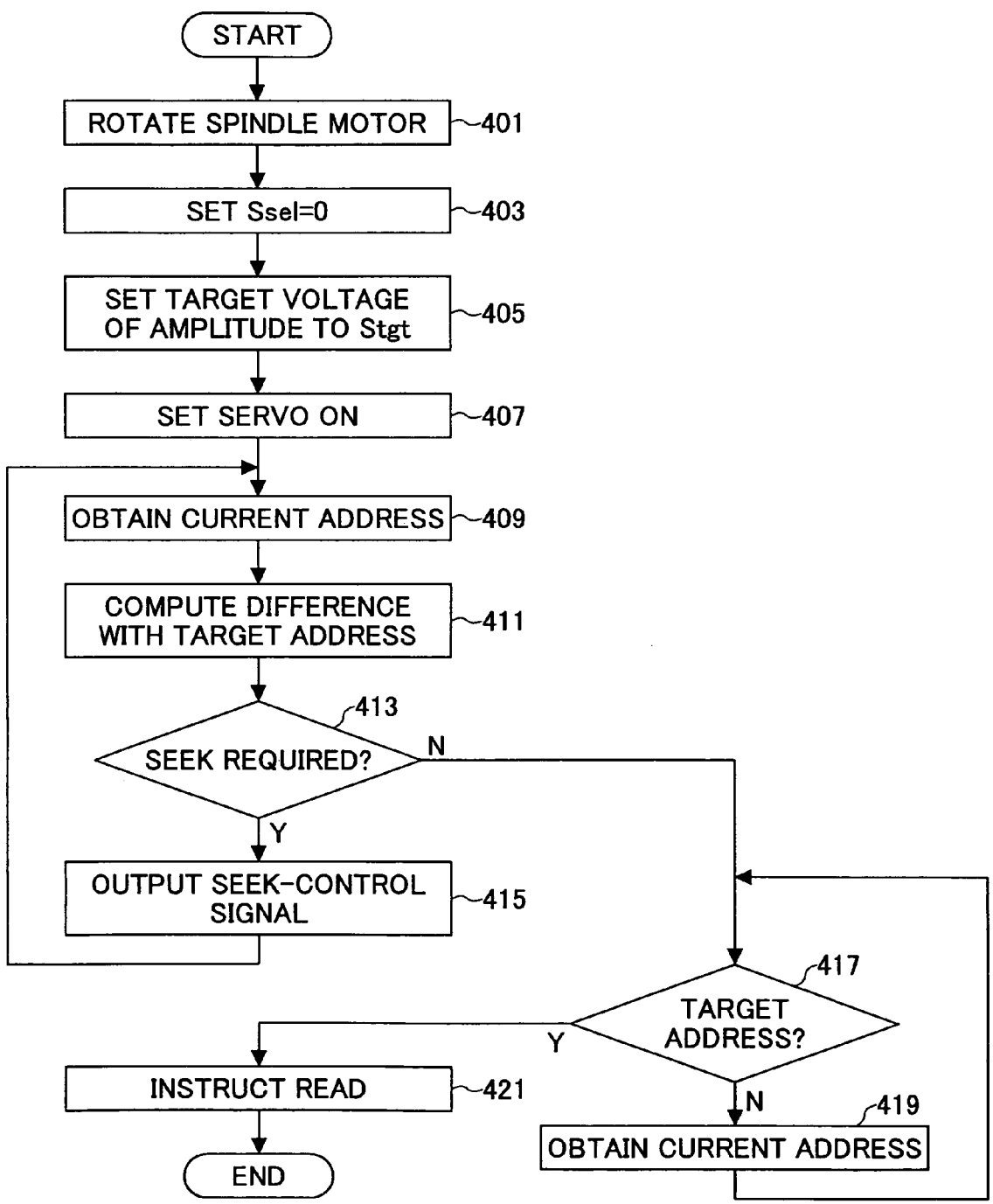
FIG. 6 is a flowchart for describing a reproducing process in an optical-disk apparatus that is performed according to a reproducing command from a host.

Next, a process in an optical-disk apparatus 20 when receiving a reproducing command from the host (a reproducing process) is described with reference to FIG. 6. In the flowchart in FIG. 6, corresponding to a processing-algorithm sequence that is executed by the CPU 40, upon receiving a reproducing command from the host, the start address of the program corresponding to the flowchart in FIG. 6 is set in a program counter of the CPU 40 and the reproducing process starts. It is to be noted herein that, as an example, the first gain and the second gain are set initial values such that the amplification factors are almost 1 (0 dB) for each gain.

In a first step 401, a control signal for controlling rotation of the spindle motor 22 based on the rate of reproducing is output to the motor driver 27, and the fact that a reproducing command is received from the host is signaled to the reproducing-signal processing circuit 28.

In a subsequent step 403, the selecting signal Ssel is set to zero. Hereby, at the toggle switch c5 of the wobble-signal detecting circuit 28c, the output signal of the amplitude-detecting circuit c3 is selected. Moreover, at the toggle switch c14, the output signal of the amplitude-detecting circuit c12 is selected.

Figure 7:
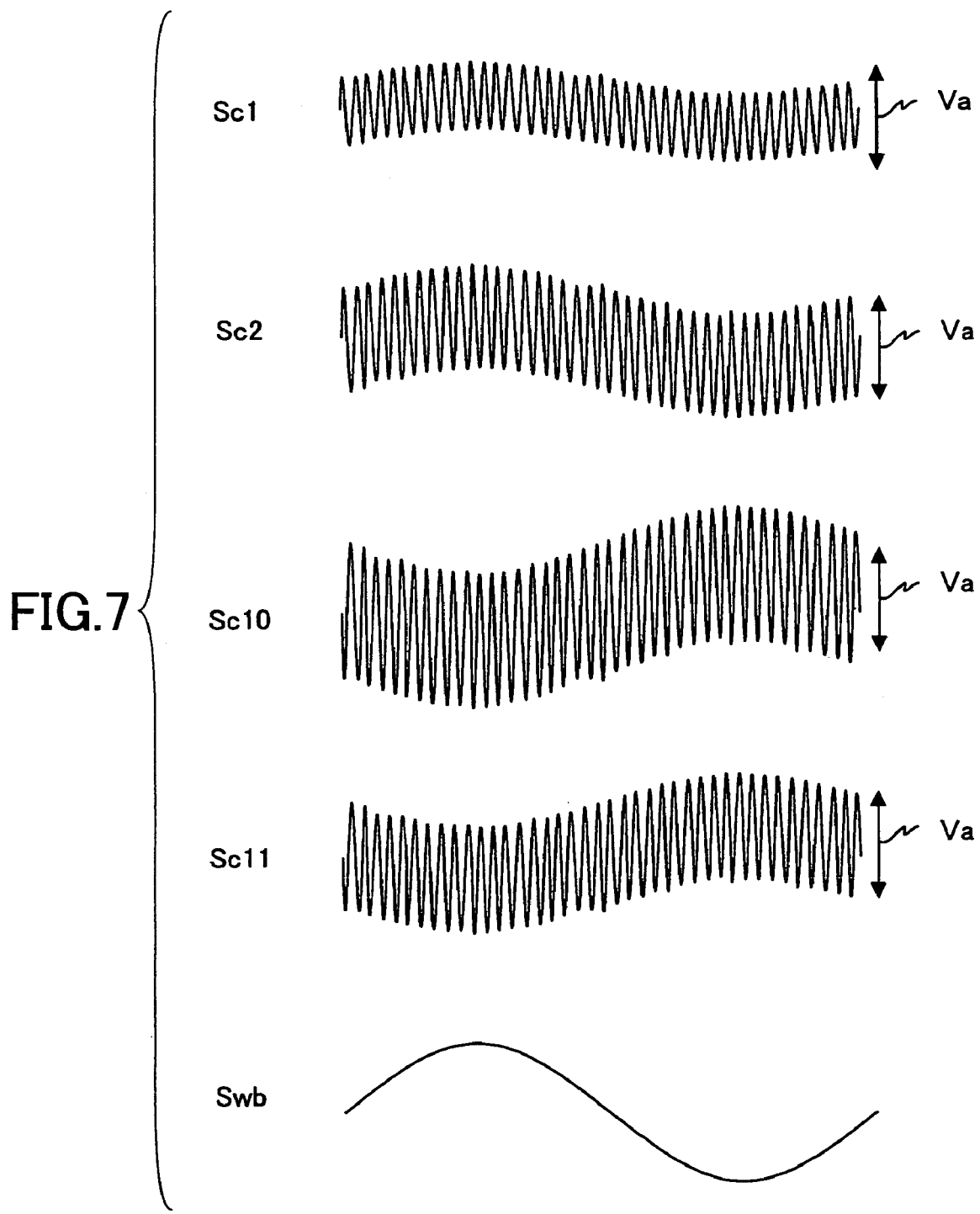
FIG. 7 is a waveform chart for describing an operation of the wobble-signal detecting circuit in FIG. 4 in a reproducing process.

In a subsequent step 405, a value corresponding to the target voltage of the amplitude (to be Va) is set for the target-voltage signal Stgt. Hereby, for example, when the amplitude of the output signal Sc1 of the adder circuit c1 is approximately two-thirds of the target voltage Va (refer to Sc1 in FIG. 7), the first gain is approximately 1.5 times so that the amplitude of the output signal Sc2 of the gain-control amplifier circuit c2 almost corresponds with the target voltage Va (refer to Sc2 in FIG. 7). Moreover, for example, when the amplitude of the output signal Sc10 of the adder circuit c10 is approximately 1.5 times the target voltage Va (refer to Sc10 in FIG. 7), the second gain is approximately two-thirds so that the amplitude of the output signal Sc11 of the gain-control amplifier circuit c11 almost corresponds with the target voltage Va (refer to Sc11 in FIG. 7). Then, the output signal of the subtractor circuit c18, or the wobble signal Swb, is a signal having the amplitude almost twice the amplitude of the target voltage Va (refer to Swb in FIG. 7).

In a subsequent step 407, once confirming that the rotation of the optical disk 15 provides a predetermined linear velocity, the state of the servo being on is set for the servo controller 33. Hereby, the tracking control and the focus control are performed as described above. It is to be noted that the tracking control and the focus control are performed at any time until the reproducing process is completed.

In a subsequent step 409, the current address is obtained based on the address information from the decoder 28e.

In a subsequent step 411, a difference between the current address and the target address extracted from the reproducing command (an address difference) is computed.

In a subsequent step 413, whether a seek is necessary is determined based on the address difference. Herein, referring to a threshold value stored in the flash memory 39 as one of the seek information items as described above, if the address difference exceeds the threshold value, the determination herein is affirmative, proceeding to step 415.

In this step 415, a signal for controlling the seek motor in accordance with the address difference is output to the motor driver 27. Then, the process returns to step 409 as described above.

On the other hand, in the step 413 as described above, if the seek is not required, the determination here is negative, proceeding to step 417.

In this step 417, whether the current address corresponds to the target address is determined. If the current address does not correspond to the target address, the determination is negative, proceeding to step 419.

In this step 419, the current address is obtained based on the address information from the decoder 28e.

Below, until the determination in step 417 as described above becomes affirmative, the process of steps 417 through 419 is performed repeatedly.

If the current address corresponds to the target address, the determination in step 417 as described above becomes affirmative, proceeding to step 421.

In this step 421, a read is sent to the reproducing-signal processing circuit 28. Hereby, reproducing data are obtained at the reproducing-signal processing circuit 28, and are stored in the buffer RAM 34. These reproducing data are transferred sector by sector to the host via the buffer manager 37 and the interface 38. Then, once all of the reproducing of the data designated from the host is completed, a predetermined completion process is performed, and then the reproducing process is terminated.

(Recording Process)

Figure 8:
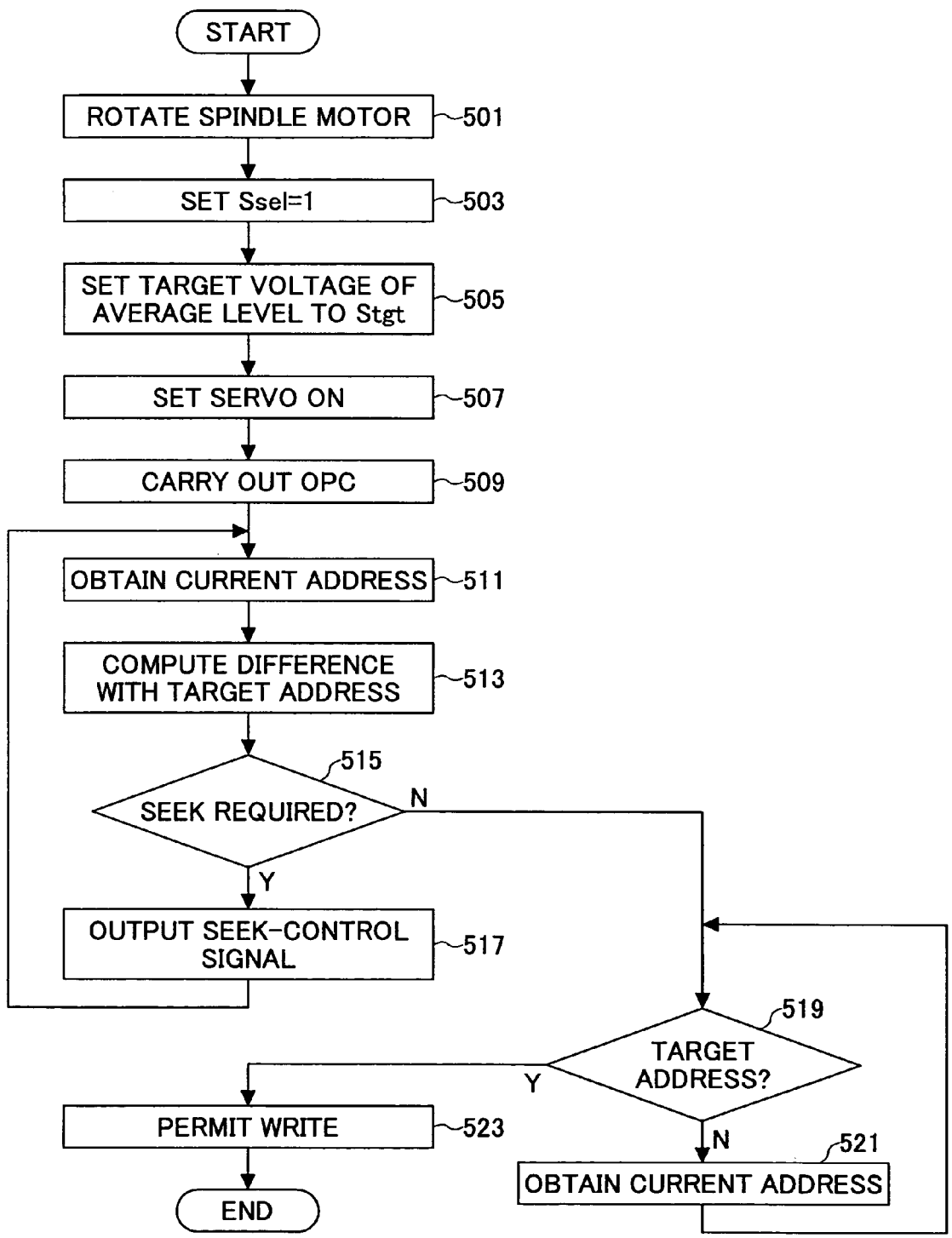
FIG. 8 is a flowchart for describing a recording process in the optical-disk apparatus that is performed according to a recording command from the host.

Furthermore, a process in the optical-disk apparatus 20 when receiving a recording command from the host (a recording process) is briefly described with reference to FIG. 8. In this flowchart in FIG. 8 corresponding to a processing-algorithm sequence performed by the CPU 40, once the recording command is received from the host, the start address of a program corresponding to the flowchart in FIG. 8 is set into a program counter of the CPU 40 and the recording process is started. It is to be noted that, herein, as an example, the first gain and the second gain are set such that as the initial values the amplification factors of each gain are almost 1 (0 dB).

In a first step 501, a control signal for controlling rotation of the spindle motor 22 based on the rate of recording is output to the motor driver 27 and the fact that a recording command is received from the host is signaled to the reproducing-signal processing circuit 28. Moreover, an accumulating in the buffer RAM 34 of data received from the host (recording data) is reported to the buffer manager 37.

Figure 9:
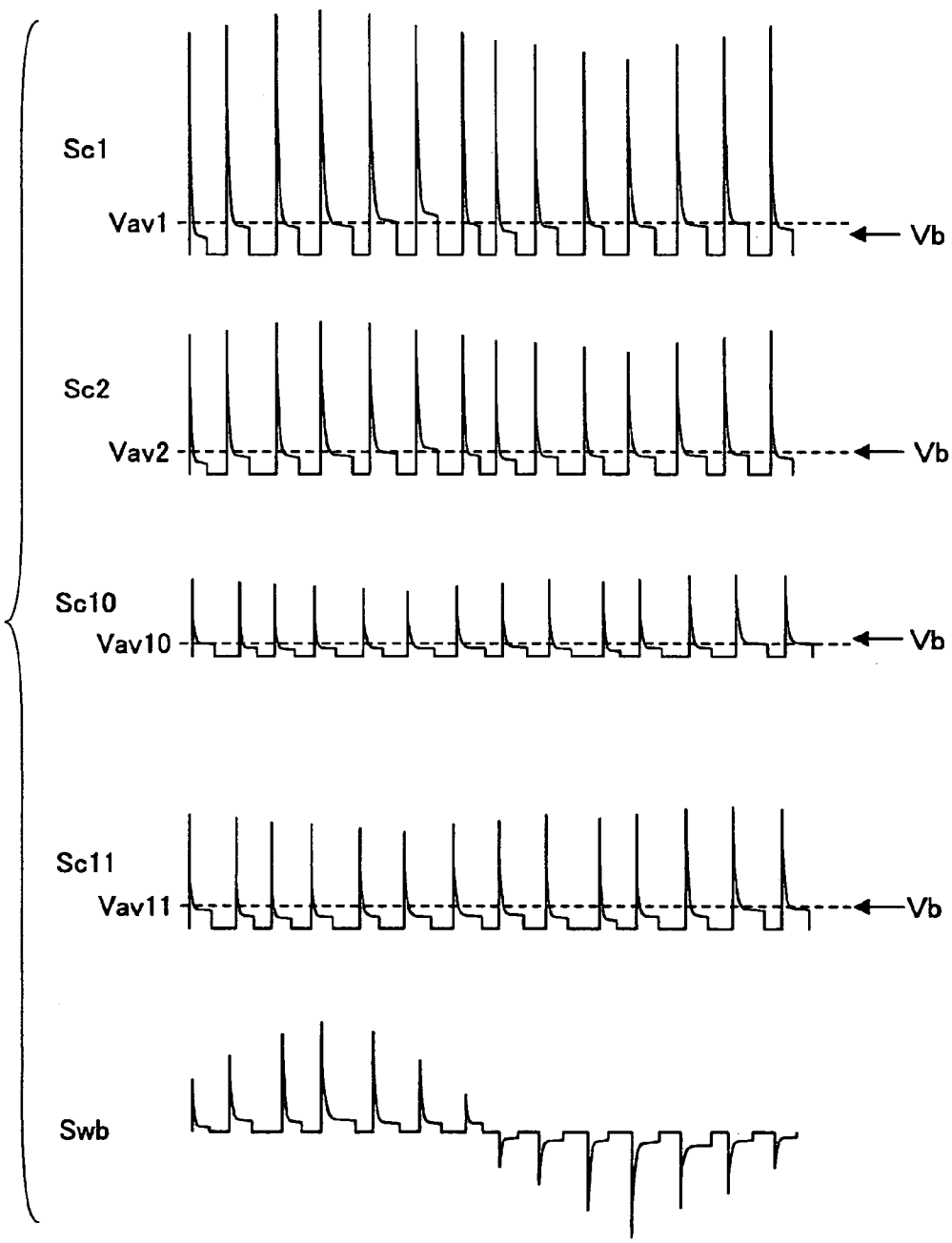
FIG. 9 is a waveform chart for describing an operation of the wobble-signal detecting circuit in FIG. 4 in a recording process.

In a subsequent step 503, the selecting signal Ssel is set to 1. Hereby, at the toggle switch c5 of the wobble-signal detecting circuit 28c, the output signal of the average-level detecting circuit c4 is selected. Moreover, at the toggle switch c14, the output signal of the average-level detecting circuit c13 is selected. Herein, as the output signals of the gain-control amplifier circuits, as illustrated in FIG. 9 as an example, have an impulse-shaped signal waveform with the large peak value corresponding to a write pulse (signal characteristics), it is difficult to accurately detect the amplitude of the signal. Thus, for this case, the average level is to be detected.

In a subsequent step 505, a value corresponding to the target voltage of the average level (to be Vb) is set for the target-voltage signal Stgt. Hereby, for example, when the average level of the output signal Sc1 of the adder circuit c1 (to be Vav1) is approximately 1.5 times the target voltage Vb (refer to Sc1 in FIG. 9), the first gain is approximately two-thirds and the average level of the output signal Sc2 of the gain-control amplifier circuit c2 (to be Vav 2) almost corresponds to the target voltage Vb (refer to Sc2 in FIG. 9). Moreover, for example, when the average level of the output signal Sc10 of the adder circuit c10 (to be Vav10) is approximately two-thirds of the target voltage Vb (refer to Sc10 in FIG. 9) the second gain is approximately 1.5 times and the average level of the output signal Sc11 of the gain-control amplifier circuit c11 (to be Vav11) almost corresponds with the target voltage Vb (refer to Sc11 in FIG. 9). Then, the output signal of the subtractor circuit c18, or the wobble signal Swb, has the average level at almost 0 (refer to Swb in FIG. 9).

In a subsequent step 507, once it is confirmed that the rotation of the optical disk 15 has provided a predetermined linear velocity, the state of the servo being on is set for the servo controller 33. Hereby, the tracking control and the focus control are performed as described above. It is to be noted that the tracking control and the focus control are performed at any time until the recording process is completed.

In a subsequent step 509, an OPC (Optimum Power Control) operation is carried out based on the rate of recording and the optimum recording power is obtained. In other words, after test writing predetermined sets of data in a PCA area while gradually varying the recording power, the sets of data are sequentially reproduced and, for instance, a case such that the value of asymmetry detected from the RF signal almost corresponds to the target value derived in advance by means of an experiment, etc., is determined as the highest recording quality, setting the recording power at that time as the optimum recording power.

In a subsequent step 511, the current address is obtained based on the address information from the decoder 28e.

In a subsequent step 513, a difference (an address difference) between the current address and the target address is computed.

In a subsequent step 515, whether a seek is required is determined based on the address difference. Herein the threshold value stored in the flash memory 39 as one of the seek information items as described above is referred to and if the address difference exceeds the threshold value, the determination herein is affirmative, proceeding to step 517.

In this step 517, the signal for controlling the seek motor depending on the address difference is output to the motor driver 26. Hereby, the seek motor is driven and the seek operation is performed. Then, the process returns to step 511 as described above.

It is to be noted that in step 515 as described above, if the address difference does not exceed the threshold value the determination herein is negative, proceeding to step 519.

In this step 519, whether the current address corresponds to the target address is determined. If the current address does not correspond with the target address, the determination herein is negative, proceeding to step 521.

In this step 521, the current address is obtained based on the address information from the decoder 28e. Then, the process returns to step 519 as described above.

Below, the process of steps 519 through 521 is repeatedly performed until the determination in step 519 as described above becomes affirmative.

If the current address corresponds to the target address, the determination in step 519 as described above is affirmative, proceeding to step 523.

In this step 523, a write is permitted for an encoder 25. Hereby, the recording data are written in an optical disk 15 via the encoder 25, the laser-control circuit 24 and the optical-pickup apparatus 23. Once all the recording data are written, a predetermined completion process is performed and then the recording process is terminated.

As apparent from the descriptions as described above, in the optical-disk apparatus 20 according to the present embodiment, a push-pull signal-generating circuit is implemented by means of the wobble-signal detecting circuit 28c as described above. Then, a gain-determining circuit is implemented by means of two amplitude-detecting circuits (c3, c12), two average-level detecting circuits (c4, c13), two toggle switches (c5, c14), two comparators (c6, c15), two charging pumps (c7, c16), and two capacitors (c9, c17).

Moreover, in the optical-disk apparatus 20 according to the present embodiment, a processing apparatus is implemented by means of the optical-pickup apparatus 23, the CPU 40, and programs executed by the CPU 40. However, the present invention is not limited to the above as a matter of course. In other words, the embodiment as described above is simply one example so that at least a portion of the processing apparatus implemented by means of the process in accordance with the programs executed by the CPU 40 as described above may be implemented in hardware, or all may be implemented in hardware.

It is to be noted that while a case of the optical disk 15 complying with the DVD+R standards is described, the present invention is not limited to this case, so that it is sufficient that the optical disk has its tracks wobbling. For instance, it may be a DVD+RW which is a rewritable optical disk. It is to be noted that, in this case, a better outcome is obtained when setting the selecting signal Ssel to 0 and setting the value corresponding to the target voltage of the amplitude for the target voltage signal Stgt in the recording process as in the reproducing process.

Also, in the embodiment as described above, while a case in which a gain-control amplifier circuit is used as a first signal-adjusting circuit is described, it is not limited to such a case.

In addition, in the embodiment as described above, while a case in which a gain-control amplifier circuit is used as a second signal-adjusting circuit is described, it is not limited to such a case.

Figure 10:
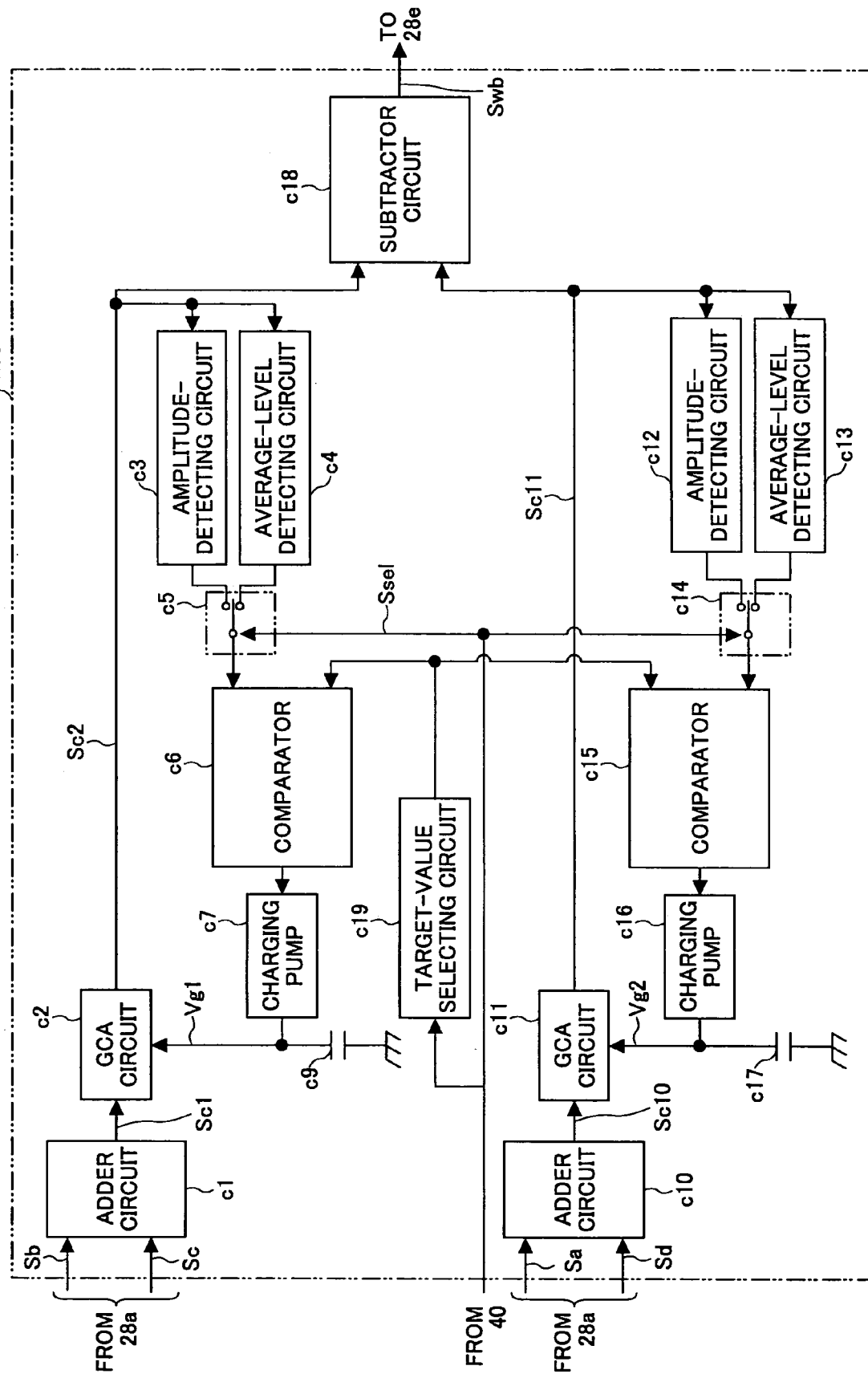
FIG. 10 is a block diagram for describing a first alternative example configuration of the wobble-signal detecting circuit in FIG. 4.

Moreover, in the embodiment as described above, while a case in which the selecting signal Ssel and the target-voltage signal Stgt are output to the wobble-signal detecting circuit 28c from the CPU 40 is described, it is not limited to such a case so that, for instance as illustrated in FIG. 10, a target-value selecting circuit c19 for selecting one of the target value of the amplitude and the target value of the average level depending on the selecting signal Ssel for outputting to each of the comparators may be provided in the wobble-signal detecting circuit 28c. In this case, the target-voltage signal Stgt is not needed.

Furthermore, in the embodiment as described above, while a case in which a charging/discharging of a capacitor is used to control the gain of each of the gain-control amplifier circuits is described, it is not limited to such a case so that when a gain-control amplifier circuit for determining the gain according to the setting value of a register is used, for instance, a circuit for varying the setting value of the register in response to the outcome compared at each of the comparators may be provided. In this case, the charging pumps and the capacitors are not needed.

Also, in the embodiment as described above, while a case in which a comparator is arranged at a latter stage of a toggle switch is described, it is not limited to such a case so that a comparator for comparing the detected amplitude and the target value of the amplitude may be arranged at a latter stage of an amplitude-detecting circuit, for instance, and a comparator for comparing the average level detected and the target value of the average level may be arranged at a latter stage of an average-level detecting circuit and one of the output signals of each of the comparators is selected with a toggle switch.

Figure 11:
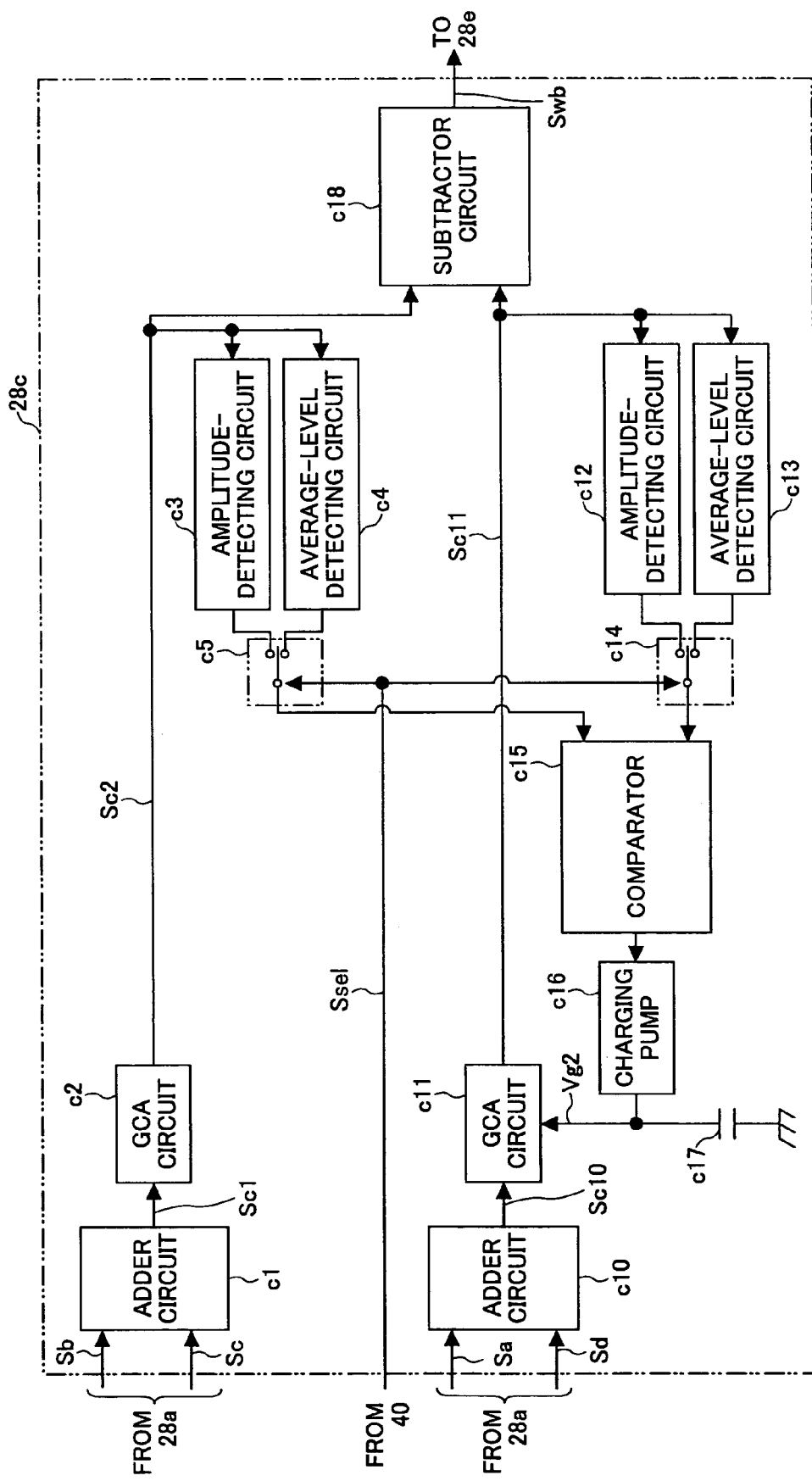
FIG. 11 is a block diagram for describing a second alternative example configuration of the wobble-signal detecting circuit in FIG. 4.

In addition, in the embodiment as described above, at least one of the first gain and the second gain may be determined such that the output signals of each of the toggle switches are almost equal. In FIG. 11, as an example, a wobble-signal detecting circuit when determining only the second gain is illustrated. In this case, the output signal of the toggle switch c5 and the output signal of the toggle switch c14 become the input signals of the comparator c15. The comparator c15 compares the output signal of the toggle switch c5 and the output signal of the toggle switch c14 and the outcome compared is output to the charging pump c16. Then the charging pump c16, as in the embodiment as described above, performs a charging or a discharging of the capacitor c17 depending on the outcome compared at the comparator c15. Hereby, the output signal Sc11 of the gain-control amplifier circuit c11 is controlled such that its amplitude or the average level almost corresponds with the amplitude or the average level in the output signal Sc2 of the gain-control amplifier circuit c2. Hereby, the comparator c6, the charging pump c7, and the capacitor c9 are not needed, enabling a further reduction in size and cost.

(Second Embodiment)

Figure 12:
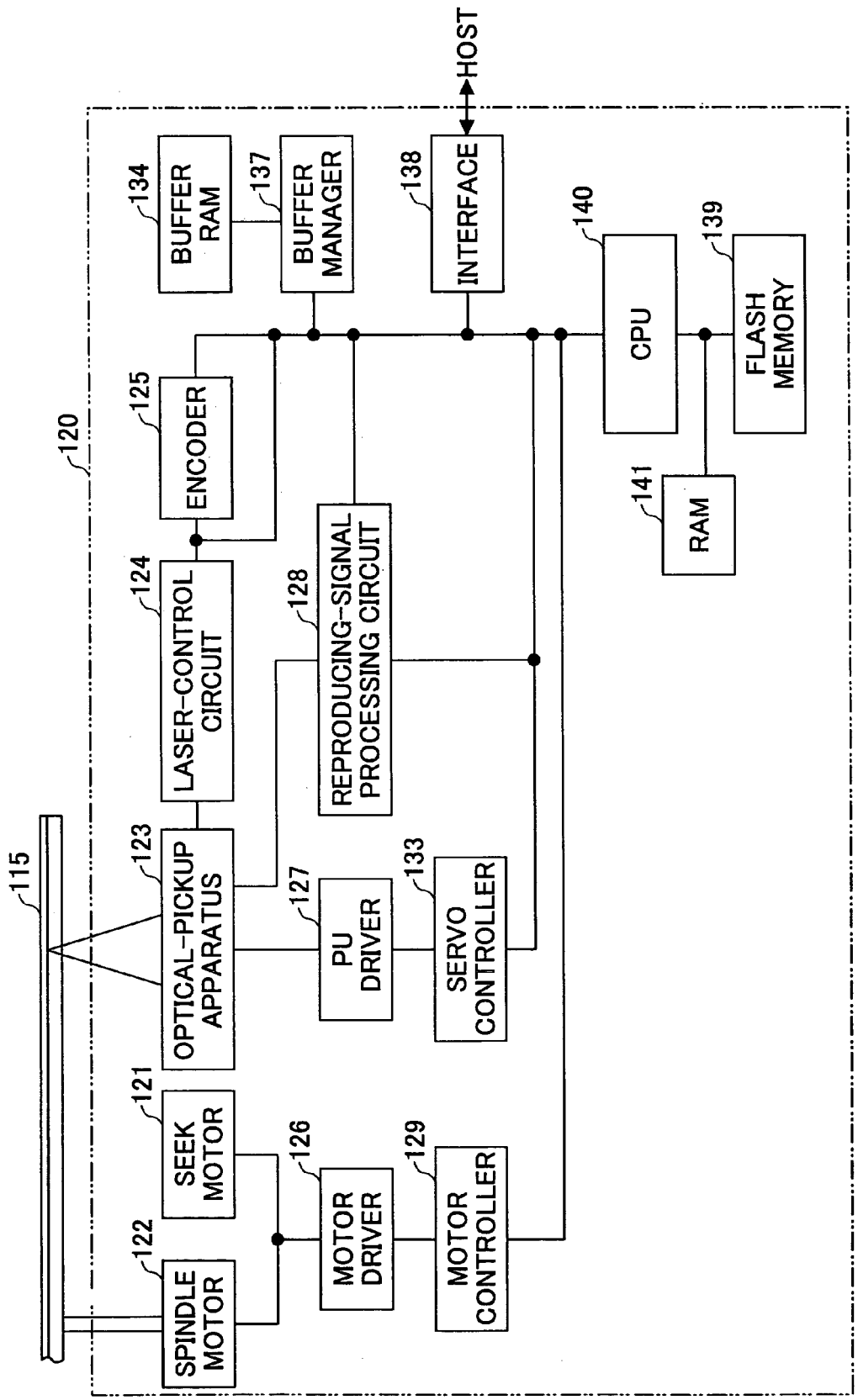
FIG. 12 is a block diagram illustrating a configuration of the optical-disk apparatus according to a second embodiment of the invention.

Next, a second embodiment of the present invention is described with reference to drawings. FIG. 12 illustrates a schematic configuration of an optical-disk apparatus 120 according to an embodiment of the invention.

The optical-disk apparatus 120 illustrated in FIG. 12 is provided with a seek motor 121, a spindle motor 122, an optical-pickup apparatus 123, a laser-control circuit 124, an encoder 125, a motor driver 126, a PU driver 127, a reproducing-signal processing circuit 128, a motor controller 129, a servo controller 133, a buffer RAM 134, a buffer manager 137, an interface 138, a flash memory 139, a CPU 140 and a RAM 141, etc. It is to be noted that connecting lines in FIG. 12 indicate representative flows of signals and information, but do not indicate all of the interconnecting relationships among the different blocks. It is to be assumed that an information-recording medium complying with the DVD+R standards is used for the optical disk 15 as an example in the present embodiment.

The seek motor 121 is a motor for driving the optical-pickup apparatus 123 in the sledge direction (the Z-axis direction in FIG. 2). The spindle motor 122 is a motor for driving the rotation of the optical disk 115.

The optical-pickup apparatus 123 is an apparatus for irradiating a laser beam onto a recording surface of the optical disk 115 having formed tracks as well as for photo-detecting the beam reflected from the recording surface. This optical-pickup apparatus 123 as an example may use the optical-pickup apparatus in FIG. 2 used for describing the first embodiment. The optical-pickup apparatus described in detail as in the above is not described further.

Figure 13:
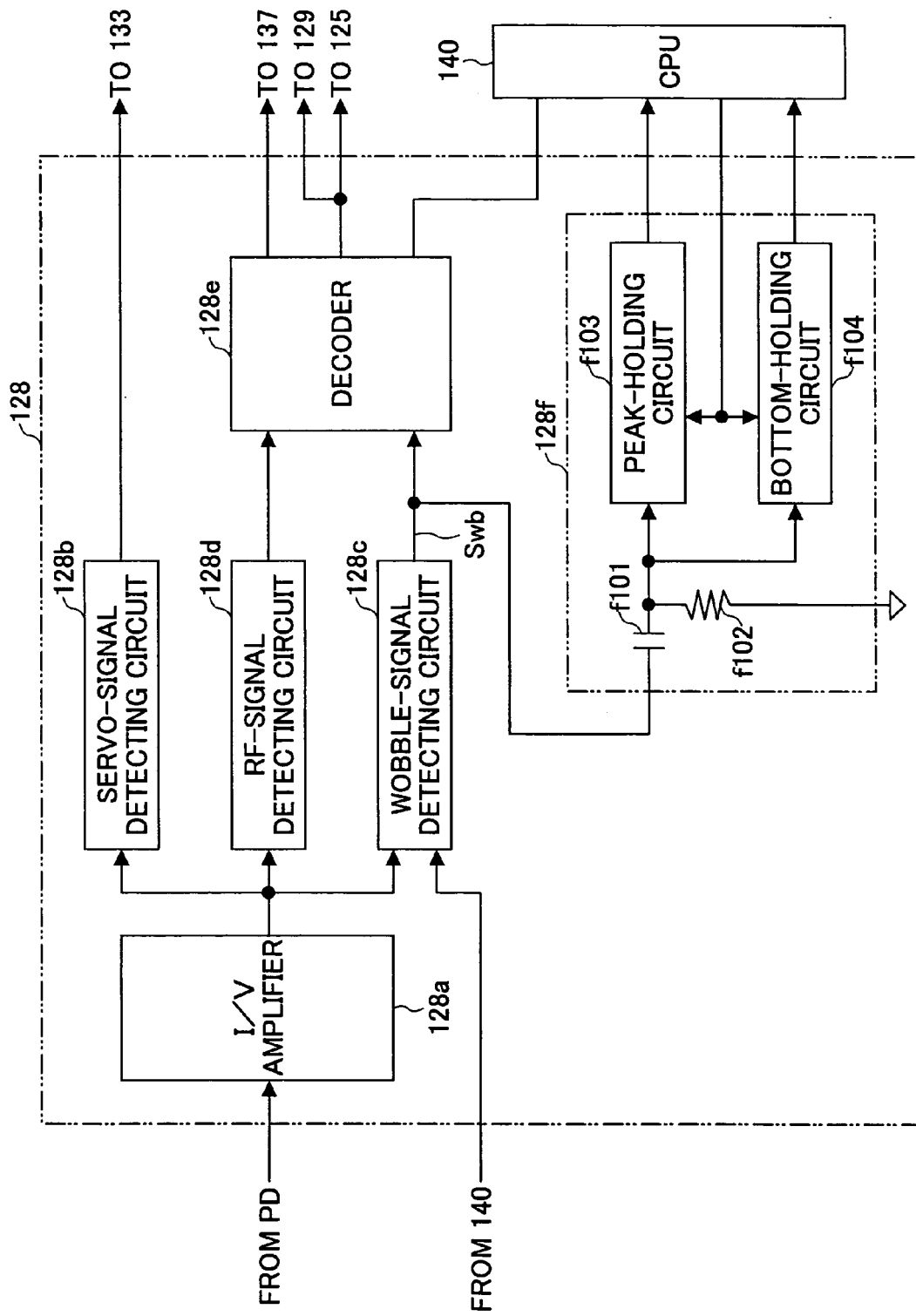
FIG. 13 is a block diagram for describing a configuration of a reproducing-signal processing circuit in FIG. 12.

The reproducing-signal processing circuit 128, as illustrated in FIG. 13, is configured with an I/V amplifier 128a, a servo-signal detecting circuit 128b, a wobble-signal detecting circuit 128c, a RF-signal detecting circuit 128d, a decoder 128e and a holding circuit 128f, etc.

The I/V amplifier 128a converts to a voltage signal for amplifying at a predetermined gain a current signal from a photo-detector PD.

The servo-signal detecting circuit 128b, based on the output signal of the I/V amplifier 128a, detects a servo signal (a focus-error signal and a track-error signal, etc.). The servo signal detected herein is output to the servo controller 133.

Figure 14:
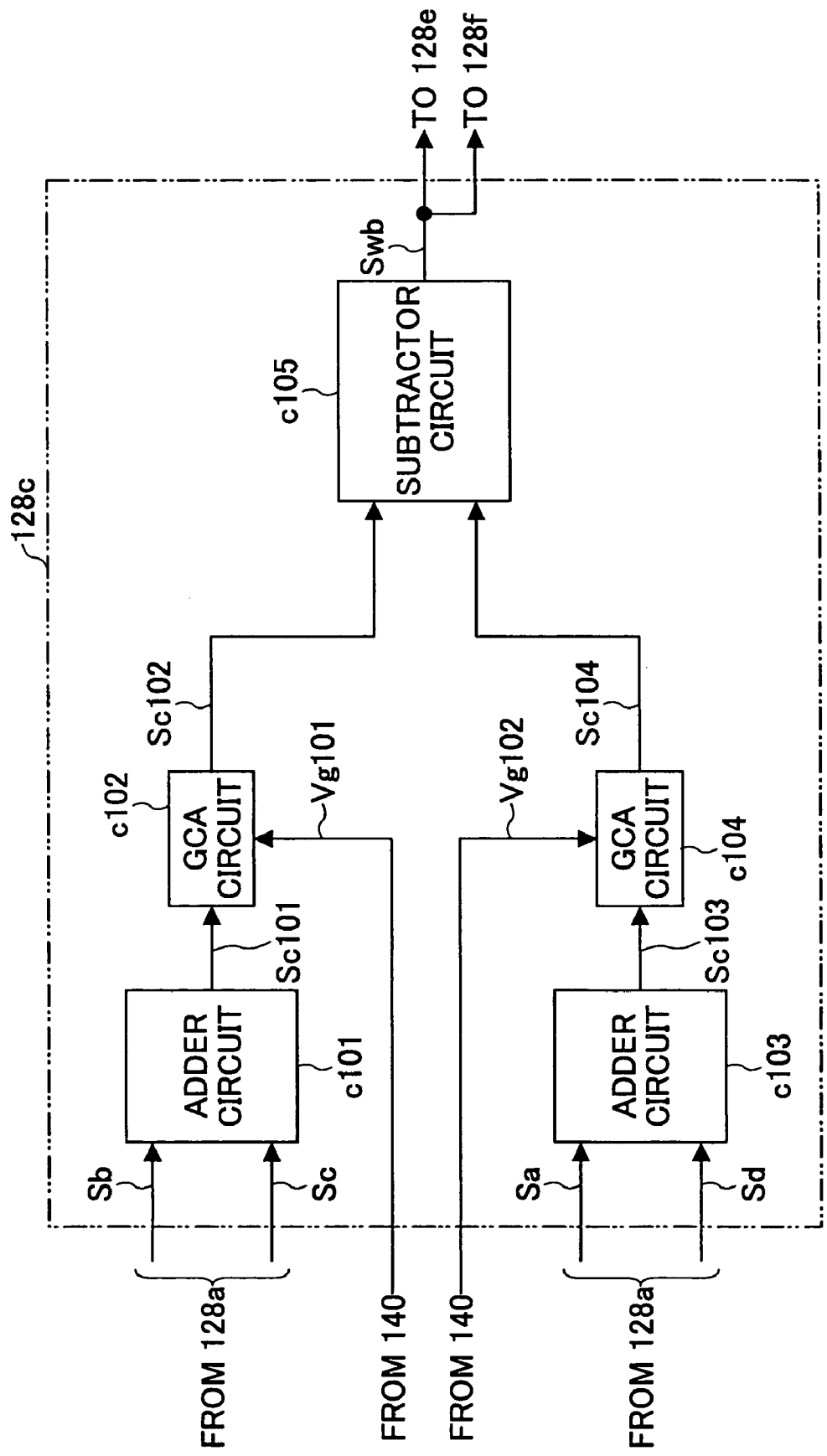
FIG. 14 is a block diagram for describing a configuration of a wobble-signal detecting circuit in FIG. 12.

The wobble-signal detecting circuit 128c, based on the output signal of the I/V amplifier 128a, detects a wobble signal Swb. This wobble-signal detecting circuit 128c, as illustrated in FIG. 14 as an example, has two adder circuits (c101, c103) and two GCA (Gain Control Amplifier) circuits (c102 (a first signal-adjusting circuit), c104 (a second signal-adjusting circuit)), and a subtractor circuit c105 (a difference-signal generating circuit).

The adder circuit c101 generates a signal Sc101 having added each of the output signals Sb and Sc of the I/V amplifier 128a. Herein, the signal Sb is an output signal of the I/V amplifier 128a corresponding to the output signal of the photo-detecting region PDb, and the signal Sc is an output signal of the I/V amplifier 128a corresponding to the output signal of the photo-detecting region PDc. In other words, from the adder circuit c101, the signal Sc101 corresponding to a first photo-electric converting signal is output to the GCA circuit c102.

The GCA circuit c102 amplifies the output signal Sc101 of the adder circuit c101 at a first gain. The amplified signal Sc102 is output to the subtractor circuit c105. It is to be noted that the first gain can be varied within a predetermined range (for instance from −6 dB to +6 dB) with a gain-control signal Vg101 from the CPU 140. Herein, it is set such that the larger the gain-control signal Vg101 the larger the first gain, and the smaller the gain-control signal Vg101 the smaller the first gain.

The adder circuit c103 generates a signal Sc103 having added the output signals Sa and Sd of the I/V amplifier 128a. Herein, the signal Sa is an output signal of the I/V amplifier 128a corresponding to the output signal of the photo-detecting region PDa, and the signal Sd is an output signal of the I/V amplifier 128a corresponding to the output signal of the photo-detecting region PDd. In other words, from the adder circuit c103, the output signal Sc103 corresponding to a second photo-electric converting signal is output to the GCA circuit c104.

The GCA circuit c104 amplifies the output signal sc103 of the adder circuit c103 at a second gain. The amplified signal Sc104 is output to the subtractor circuit c105. It is to be noted that the second gain can be varied within a predetermined range (for example, from −6 dB to +6 dB) with a gain-control signal Vg102 from the CPU140. Herein, it is set such that the larger the gain-control signal Vg102 the larger the second gain, and the smaller the gain-control signal Vg102, the smaller the second gain.

The subtractor circuit c105 subtracts the output signal Sc104 of the GCA circuit c104 from the output signal Sc102 of the GCA circuit c102 and generates a subtracted signal (a push-pull signal). The subtracted signal generated herein is output to the decoder 128e and the holding circuit 128f as the wobble signal Swb.

The holding circuit 128f detects the peak level and the bottom level of the wobble signal Swb. Herein, as illustrated in FIG. 13 as an example, it has a capacitor f101 and a resistor f102 for AC coupling the wobble signal Swb, a peak-holding circuit f103 for detecting the peak level (the absolute value to be Ip) and a bottom-holding circuit f104 for detecting the bottom level (the absolute value to be Ib) of the AC coupled wobble signal Swb. Each of the peak level Ip and the bottom level Ib detected herein are output to the CPU 140. It is to be noted that in the peak-holding circuit f103 and the bottom-holding circuit f104, the holding is started in synchronization with a start signal from the CPU 140.

The RF-signal detecting circuit 128d detects a RF signal based on the output signal of the I/V amplifier 128a. The RF signal detected herein is output to the decoder 128e.

The decoder 128e extracts address information and synchronization information, etc., from the wobble signal Swb.

The address information extracted herein is output to the CPU 140, and the synchronization information is output to the encoder 125 and the motor controller 129, etc., as a clock signal Wck. Moreover, the decoder 128e performs a decoding process and an error-detection process, etc., for the RF signal, performs an error-correction process when an error is detected, and then stores the RF signal as reproduced data in the buffer RAM 134 via the buffer manager 137. It is to be noted that the RF signal contains address information and the decoder 128e outputs the address information extracted from the RF signal to the CPU 140.

Returning to FIG. 12, the servo controller 133 generates a focus-control signal for correcting for a focus offset based on a focus-error signal from the servo-signal detecting circuit 128b and generates a tracking-control signal for correcting for a track offset based on a track-error signal. Each of the control signals generated herein is output to the PU driver 127.

The PU driver 127 outputs to the optical-pickup apparatus 123 a signal for driving the focusing actuator as described above corresponding to the focus-control signal as described above, and outputs to the optical-pickup apparatus 123 a signal for driving the tracking actuator as described above corresponding to the tracking-control signal as described above. In other words, the tracking control and the focus control are performed by means of the servo-signal detecting circuit 128, the servo controller 133, and the PU driver 127.

The motor controller 129, based on an instruction from the CPU 140, generates a rotation-control signal for controlling the rotation of the spindle motor 122. Moreover, the motor controller 129, based on an instruction of the CPU 140, generates a seek-control signal for controlling the driving of the seek motor 121. Each of the control signals generated herein is output to the motor driver 126.

The motor driver 126 outputs the driving signal corresponding to the rotation-control signal as described above to the spindle motor 122 and outputs the driving signal corresponding to the seek-control signal as described above to the seek motor 121.

In the buffer RAM 134, data for recording in the optical disk (recording data) and data reproduced from the optical disk (reproduced data), etc., are temporarily stored.

The buffer manager 137 manages the input/output of data to/from the buffer RAM 134. Then, once the amount of data accumulated in a buffer area reaches a predetermined amount, the CPU 140 is notified.

The encoder 125, based on an instruction of the CPU 140, takes out recording data accumulated in the buffer RAM 134 via the buffer manager 137, performs predetermined data modulation and adding of error-correction codes, etc., and generates a signal for writing in the optical disk 115. The write signal generated herein together with a clock signal Wck are output to the laser-control circuit 124.

The laser-control circuit 124 controls the power of the laser beam irradiated onto the optical disk 115. For instance, at the time of recording, based on recording conditions, light-emission characteristics of the semiconductor laser LD, the write signal from the encoder 125, and the clock signal Wck, etc., a signal for driving the semiconductor laser LD is generated.

The interface 138, a bi-directional communications interface with the host, complies with the ATAPI standards as an example.

The flash memory 139 is provided with a program area and a data area, the program area having stored programs written in a code readable by the CPU 140. Moreover, in the data area is stored information regarding the light-emission characteristics of the semiconductor laser LD, information regarding the seek operation of the optical-pickup apparatus 123, recording conditions, and a gain table, etc. The gain table as described above contains a relationship between the gain-control signal Vg101 and the first gain, and a relationship between the gain-control signal Vg102 and the second gain, etc., that are obtained in advance by means of an experiment, a simulation, and a theoretical calculation, etc. This gain table is prepared in at least either one of a manufacturing step, a testing step, and an adjusting step of the optical-disk apparatus 120, for instance.

The CPU 140 controls the operations of each of the sections as described above according to programs stored in a program area of the flash memory 139 and stores data required for control in the RAM 141. It is to be noted that in the CPU 140 an A/D converter and a D/A converter (not shown) are annexed, enabling an analog signal to be input to the CPU 140 via the A/D converter. Moreover, a signal from the CPU 140 to an analog circuit is enabled to be output via the D/A converter.

Figure 15A:
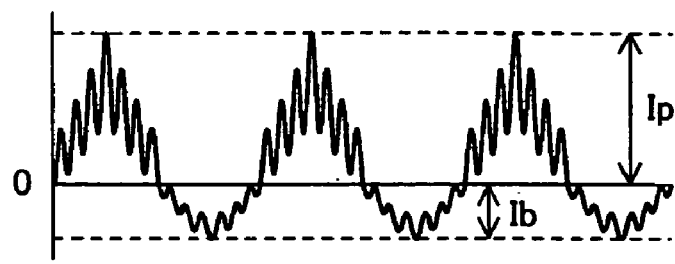
FIGS. 15A through 15C are waveform charts for describing the peak level and the bottom level of each of the signals.
Figure 15B:
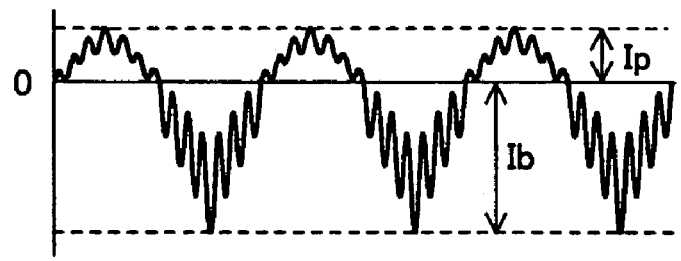
Figure 15C:
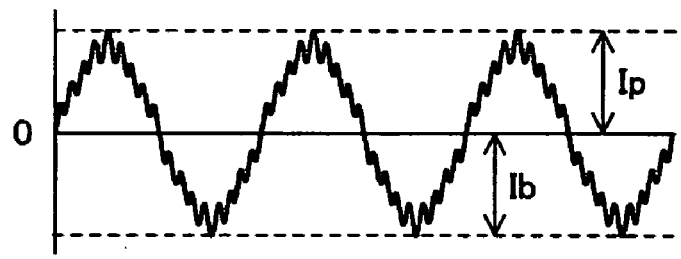

Furthermore, the CPU 140, at the time a wobble signal is detected, determines whether the peak level Ip and the bottom level Ib are almost equal, and as illustrated in FIG. 15A for example, when Ip is greater than Ib, the gain-control signal Vg101 is decreased and the gain-control signal Vg102 is increased with reference to the gain table such that Ip nearly equals Ib. On the other hand, as illustrated in FIG. 15B for example, when Ip is less than Ib, the gain-control signal Vg101 is increased and the gain-control signal Vg102 is decreased with reference to the gain table as described above such that Ip nearly equals Ib. Hereby as illustrated in FIG. 15C for example, Ip nearly equals Ib so that the noise levels contained in each of the first and the second photoelectric converting signals are almost equal to each other. Therefore, reducing of the noise (for example, a RF-signal component) within the wobble signal Swb is enabled. It is to be noted that such adjustment of each of the gain-control signals is performed at any time during the detection process of the wobble signal.

It is to be noted that at least a portion of the process according to the programs executed by the CPU 140 may be implemented in hardware.

It is to be noted that, while in the embodiment as described above a case in which the optical disk 115 complies with the DVD+R standards is described, the present invention is not limited to such a case so that it is sufficient that the optical disk has tracks wobbling. For example, it may be a DVD+RW which is a rewritable optical disk. Moreover, it may be a DVD-R, a DVD-RW, a CD-R, or a CD-RW.

Also, while in the embodiment as described above a case in which the GCA circuit c102 is used as a first signal-adjusting circuit is described, it is not limited to such a case so that circuits other than a GCA circuit may be used.

In addition, while in the embodiment as described above a case in which the GCA circuit c104 is used as a second signal-adjusting circuit is described, it is not limited to such a case so that circuits other than a GCA circuit may be used.

Moreover, while in the embodiment as described above a case in which the peak level and the bottom level of a wobble signal are detected at the holding circuit 128f is described, for instance when a level-detecting circuit is provided for detecting the peak level and the bottom level of the RF signal in order to evaluate the recording quality, a circuit may be configured such that the level-detecting circuit is used so as to detect the peak level and the bottom level of the wobble signal. Hereby, the holding circuit 128f is not needed, enabling a further reduction in cost.

Furthermore, while in the embodiment as described above a case in which the first gain and the second gain as described above are determined such that Ip is nearly equal to Ib by means of the CPU 140, it is not limited to such a case. In other words, depending on the kind of the noise convoluted, the first gain and the second gain may be determined such that Ip and Ib have an optimal relationship.

Also, while in the embodiment as described above a case is described in which both the first gain and the second gain as described above are determined by means of the CPU 140, it is not limited to such a case so that only one of the first gain and the second gain may be determined.

Figure 16:
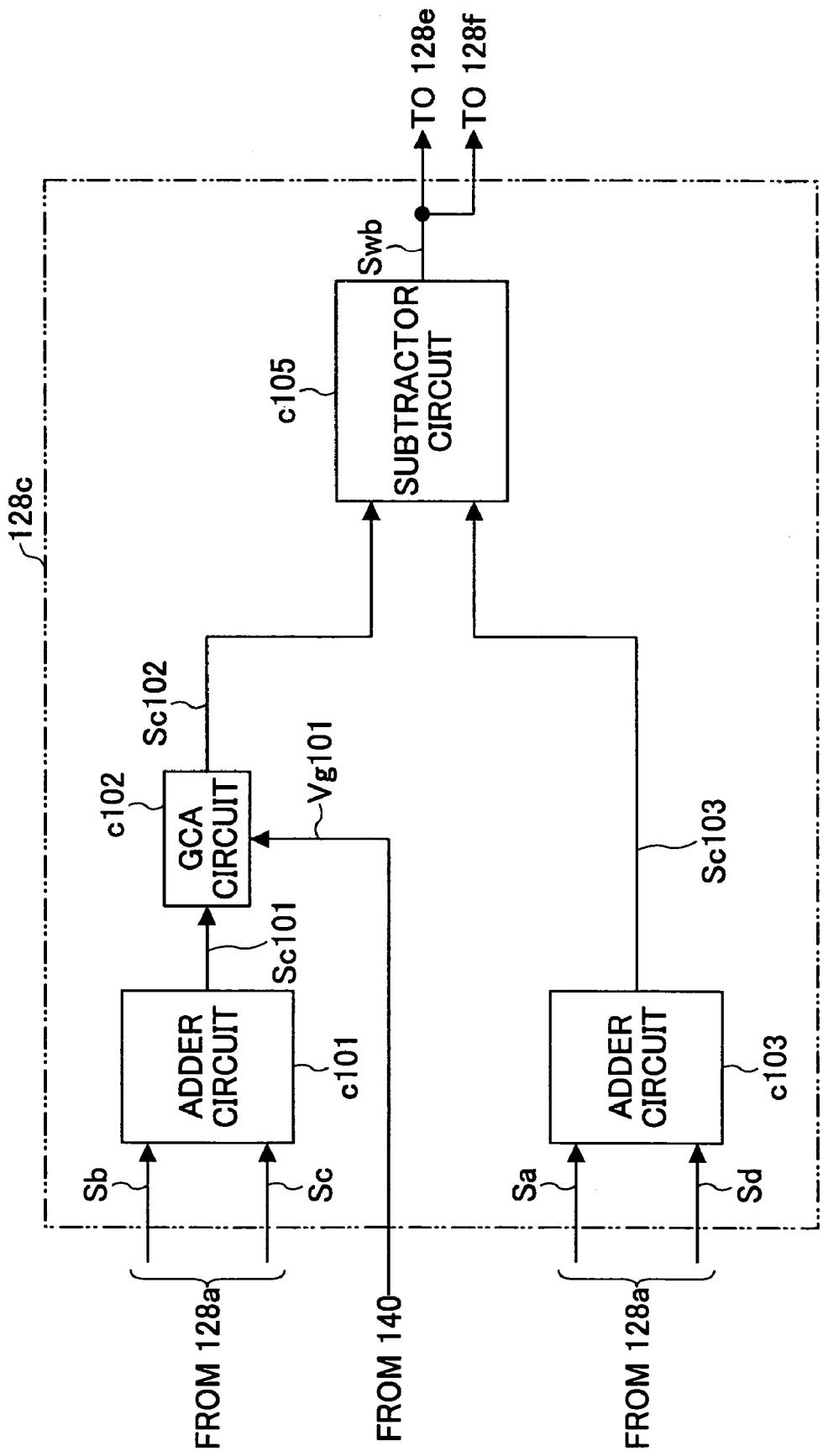
FIG. 16 is a block diagram for describing a wobble-signal detecting circuit in a case such that there is one GCA circuit.

In addition, while in the embodiment as described above a case is described in which both the output signal Sc101 of the adder circuit c101 and the output signal Sc103 of the adder circuit c103 are amplified, it is not limited to this case so that only one of the signals may be amplified. As an example in FIG. 16, a case is illustrated in which only the output signal Sc101 of the adder circuit c101 is amplified. In this case, the gain-control signal Vg101 may be determined based on the following equation (1), for example. It is to be noted that k is a constant that is obtained in advance based on an experiment, etc.:

$$Vg101 = -k \times (Ip - Ib) \quad (1)$$

Figure 17:
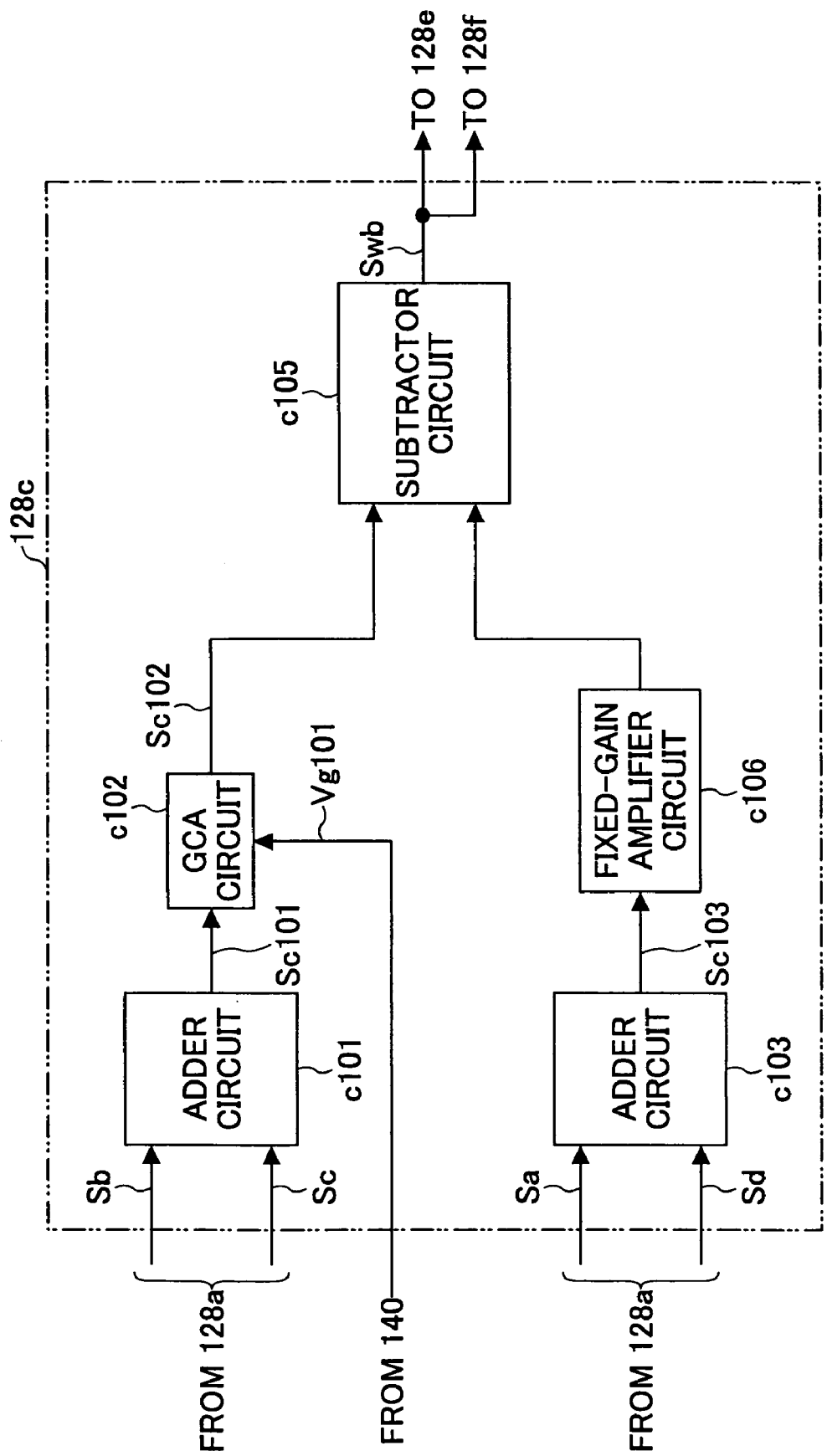
FIG. 17 is a block diagram for describing a wobble-signal detecting circuit in a case such that a fixed-gain amplifier circuit is used.

Moreover, one of the output signal Sc101 of the adder circuit c101 and the output signal Sc103 of the adder circuit c103 may be amplified at a fixed gain. As an example in FIG. 17, a case is illustrated in which the output signal Sc103 of the adder circuit c103 is amplified with a fixed-gain amplifier circuit c106.

Furthermore, while in the embodiment as described above a case is described in which the gain of each of the GCA circuits is adjusted with a voltage signal, it is not limited to such a case so that a GCA circuit may be used in which the gain is adjusted depending on the setting value of a register. In this case, the CPU 140 outputs a signal of the setting value of the register.

Also, while in the embodiment as described above a case is described in which the photo-detecting surface of the photo-detector PD as described above is divided into four parts, it is not limited to such a case. For instance, the photo-detecting surface may have a first photo-detecting device divided into two photo-detecting regions by a dividing line in the direction corresponding to the tangential direction of the tracks, and a second photo-detecting device divided into two photo-detecting regions by a dividing line in the direction corresponding to the direction orthogonal to the tangential direction of the tracks, each of the photo-detecting devices photo-detecting the returned beam flux. In this case, the photo-electric converting signals from the photo-detecting regions of the first photo-detecting device as described above become the input signals of the corresponding GCA circuits in the wobble-signal detecting circuit 128c. Therefore, the adder circuit c101 and the adder circuit c103 are not needed.

In addition, while in the first and the second embodiments as described above a case is described in which the optical-pickup apparatus is provided with one semiconductor laser, it is not limited to such a case so that it may be provided with multiple semiconductor lasers for emitting each beam flux having a wavelength different from the others. In this case, it may include at least one of a semiconductor laser emitting the beam flux with the wavelength of approximately 405 nm, a semiconductor laser emitting the beam flux with the wavelength of approximately 660 nm, and a semiconductor laser emitting the beam flux with the wavelength of approximately 780 nm. In other words, the optical-disk apparatuses may be corresponding to the multiple types of the optical disks, each type complying with different standards.

Moreover, while in the first and the second embodiments as described above a case is described in which an interface complies with the ATAPI standards, it is not limited to such a case so that it may comply with either one of the ATA (AT Attachment), the SCSI (Small Computer System Interface), the USB (Universal Serial Bus) 1.0, the USB 2.0, the IEEE 1394, the IEEE 802.3, the serial ATA and the serial ATAPI.

The present invention is not limited to the embodiments as specifically disclosed in the above so that various variations and embodiments may be contemplated without departing from the claimed scope of the present invention.

The present application is based on the Japanese Priority Application No. 2003-365431 filed on Oct. 27, 2003, the entire contents of which are hereby incorporated by reference.

The invention claimed is:

1. An apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region which are divided into two parts by a dividing line in the direction corresponding to the tangential direction of the tracks, the signals consisting of a first photo-electric converting signal from said first photo-detecting region and a second photo-electric converting signal from said second photo-detecting region, comprising:

a first signal-adjusting circuit configured to adjust said first photo-electric converting signal at a first gain;

a second signal-adjusting circuit configured to adjust said second photo-electric converting signal at a second gain;

gain-determining means configured to select one of an amplitude and an average level of an output signal of said first signal-adjusting circuit as a first determining value and selecting the amplitude or the average level which corresponds to said first determining value from one of an amplitude and an average level of an output signal of said second signal-adjusting circuit as a second determining value, and determining, based on said first determining value and said second determining value, at least one of said first gain and said second gain such that a predetermined noise component level contained in the output signal of said first signal-adjusting circuit and a predetermined noise component level contained in the output signal of said second signal-adjusting circuit are almost equal to each other; and a difference-signal generating circuit configured to generate a difference signal between the output signal of said first signal-adjusting circuit and the output signal of said second signal-adjusting circuit.

2. The apparatus for generating push-pull signals as claimed in claim 1, wherein at least one of said first signal-adjusting circuit and said second signal-adjusting circuit includes a gain-control amplifier circuit.

3. The apparatus for generating push-pull signals as claimed in claim 1, wherein said gain-determining means determines said first gain such that said first determining value almost corresponds to a target value preset.

4. The apparatus for generating push-pull signals as claimed in claim 1, wherein said gain-determining means determines said second gain such that said second determining value almost corresponds to a target value preset.

5. The apparatus for generating push-pull signals as claimed in claim 1, wherein:

said gain-determining means determines one of said first gain, and said second gain such that said first determining value and second determining value are almost equal to each other.

6. An apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region which are divided into two parts by a dividing line in the direction corresponding to the tangential direction of the tracks, the signals consisting of a first photo-electric converting signal from said first photo-detecting region and a second photo-electric converting signal from said second photo-detecting region, comprising:

a first signal-adjusting circuit configured to adjust said first photo-electric converting signal at a first gain;

a second signal-adjusting circuit configured to adjust said second photo-electric converting signal at a second gain;

a difference-signal generating circuit configured to generate a difference signal between an output signal of said first signal-adjusting circuit and an output signal of said second signal-adjusting circuit; and gain-determining means for determining, based on the peak level and the bottom level in said difference signal, at least one of said first gain and said second gain such that a predetermined noise component level contained in the output signal of said first signal-adjusting circuit and a predetermined noise component level contained in the output signal of said second signal-adjusting circuit are almost equal to each other.

7. The apparatus for generating push-pull signals as claimed in claim 6, wherein said gain-determining means determines at least one of said first gain and said second gain, such that the magnitude of the peak level and the magnitude of the bottom level in said difference signal almost correspond with each other.

8. The apparatus for generating push-pull signals as claimed in claim 6, wherein said gain-determining means comprises:

a peak-holding circuit for holding the peak level in said difference signal; and a bottom-holding circuit for holding the bottom level in said difference signal.

9. An apparatus for generating push-pull signals, used in an optical-disk apparatus having a photo-detector for photo-detecting, a light beam reflected from a recording surface of an optical disk having formed spiral-shaped or concentric-shaped tracks in at least a first photo-detecting region and a second photo-detecting region which are divided into two parts by a dividing line in the direction corresponding to the tangential direction of the tracks, the signals consisting of a first photo-electric converting signal from said first photo-detecting region and a second photo-electric converting signal from said second photo-detecting region, comprising:

a signal-adjusting circuit configured to adjust said first photo-electric converting signal;

a difference-signal generating circuit configured to generate a difference signal between an output signal of said signal-adjusting circuit and said second photo-electric converting signal; and gain-determining means configured to determine, based on the peak level and the bottom level in said difference signal, a gain of said signal-adjusting circuit such that a predetermined noise component level contained in the output signal of said signal-adjusting circuit and a predetermined noise component level contained in said second photo-electric converting signal are almost equal to each other.

10. The apparatus for generating push-pull signals as claimed in claim 9, wherein said gain-determining means determines the gain of said signal-adjusting circuit such that the magnitude of the peak level and the magnitude of the bottom level in said difference signal almost correspond with each other.

11. An optical-disk apparatus for irradiating a light beam onto a recording surface of an optical disk having formed spiral-shaped or concentric-shaped tracks, and recording and reproducing information, comprising:

a photo-detector configured to photo-detect the beam reflected from said recording surface in at least a first photo-detecting region and a second photo-detecting region which are divided into two parts by a dividing line in the direction corresponding to the tangential direction of the tracks, outputting a first photo-electric converting signal from said first photo-detecting region, and outputting a second photo-electric converting signal from said second photo-detecting region;

an apparatus for generating push-pull signals as claimed in claim 1 for generating push-pull signals consisting of said first photo-electric converting signal and said second photo-electric converting signal; and a processing apparatus for recording and reproducing information, using the push-pull signals generated at said apparatus for generating push-pull signals, wherein said gain-determining means, depending on the type of said optical disk, selects one of an amplitude and an average level of the output signal of said first signal-adjusting circuit as a first determining value, and the amplitude or the average level which corresponds to said first determining value from one of an amplitude and an average level of the output signal of said second signal-adjusting circuit as a second determining value.

12. The optical-disk apparatus as claimed in claim 11, wherein:

said optical disk is a rewritable optical disk, and said gain-determining means selects the amplitude of the output signal of said first signal-adjusting circuit as said first determining value, and selects the amplitude of the output signal of said second signal-adjusting circuit as said second determining value.

13. The optical-disk apparatus as claimed in claim 12, wherein said optical disk is a DVD+RW standards-compliant optical disk.

14. The optical-disk apparatus as claimed in claim 11, wherein, when reproducing data from said optical disk, said gain-determining means selects the amplitude of the output signal of said first signal-adjusting circuit as said first determining value, and selects the amplitude of the output signal of said second signal-adjusting circuit as said second determining value.

15. The optical-disk apparatus as claimed in claim 11, wherein, when recording data in said optical disk, said gain-determining means selects the average level of the output signal of said first signal-adjusting circuit as said first determining value, and selects the average level of the output signal of said second signal-adjusting circuit as said second determining value.

16. The optical-disk apparatus as claimed in claim 14, wherein said optical disk is a recordable-type optical disk.

17. The optical-disk apparatus as claimed in claim 16, wherein said optical disk is a DVD+R standards-compliant optical disk.

* * * * *